(12) United States Patent
Yokoyama et al.

(10) Patent No.: US 11,473,465 B2
(45) Date of Patent: Oct. 18, 2022

(54) VEHICLE

(71) Applicant: TOYOTA JIDOSHA KABUSHIKI KAISHA, Aichi-ken (JP)

(72) Inventors: Daiki Yokoyama, Gotemba (JP); Hiroshi Otsuki, Gotemba (JP); Harumi Gotou, Susono (JP); Shingo Korenaga, Shizuoka (JP); Takahiro Suzuki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/991,025

(22) Filed: Aug. 12, 2020

(65) Prior Publication Data

US 2021/0062697 A1 Mar. 4, 2021

(30) Foreign Application Priority Data

Aug. 27, 2019 (JP) .............................. JP2019-154719

(51) Int. Cl.
| | |
|---|---|
| *F01N 3/00* | (2006.01) |
| *F01N 3/08* | (2006.01) |
| *F01N 3/20* | (2006.01) |
| *F01N 3/36* | (2006.01) |

(52) U.S. Cl.
CPC ......... *F01N 3/0814* (2013.01); *F01N 3/0857* (2013.01); *F01N 3/206* (2013.01); *F01N 3/2006* (2013.01); *F01N 3/36* (2013.01); *F01N 2250/12* (2013.01); *F01N 2570/10* (2013.01); *F01N 2610/03* (2013.01)

(58) Field of Classification Search
CPC ........ F01N 3/0814; F01N 3/2006; F01N 3/36; F01N 3/0857; F01N 3/206; F01N 2610/03; F01N 2250/12; F01N 2570/10
See application file for complete search history.

(56) References Cited

U.S. PATENT DOCUMENTS

| | | | | |
|---|---|---|---|---|
| 9,181,078 | B2* | 11/2015 | Cajiga | B60S 5/02 |
| 9,682,344 | B1* | 6/2017 | Hall | B01D 53/1475 |
| 2012/0222400 | A1* | 9/2012 | Walker | F01N 3/36 60/274 |
| 2013/0278407 | A1* | 10/2013 | Rothschild | B60K 35/00 340/450.2 |
| 2013/0298532 | A1* | 11/2013 | Hamad | B01D 53/92 60/274 |
| 2013/0333638 | A1* | 12/2013 | Nishida | F02B 43/00 123/3 |
| 2017/0298880 | A1* | 10/2017 | Hall | F02M 21/0296 |
| 2019/0209961 | A1* | 7/2019 | Kennedy | B01J 20/3483 |
| 2020/0386142 | A1* | 12/2020 | Sugiyama | F01N 3/08 |
| 2020/0402072 | A1* | 12/2020 | Sugiyama | G06Q 30/018 |
| 2021/0093992 | A1* | 4/2021 | Sugiyama | B01D 53/0438 |

FOREIGN PATENT DOCUMENTS

JP 2014509360 A 4/2014

* cited by examiner

*Primary Examiner* — Matthew T Largi
(74) *Attorney, Agent, or Firm* — Hautpman Ham, LLP

(57) ABSTRACT

A vehicle 100 comprises a fuel tank for storing fuel, a fueling port for supplying the fuel tank with fuel, a $CO_2$ recovery device configured to recover $CO_2$, a $CO_2$ collection port for collecting $CO_2$ from the $CO_2$ recovery device, and a single openable lid configured to cover both the fueling port and the $CO_2$ collection port.

9 Claims, 20 Drawing Sheets

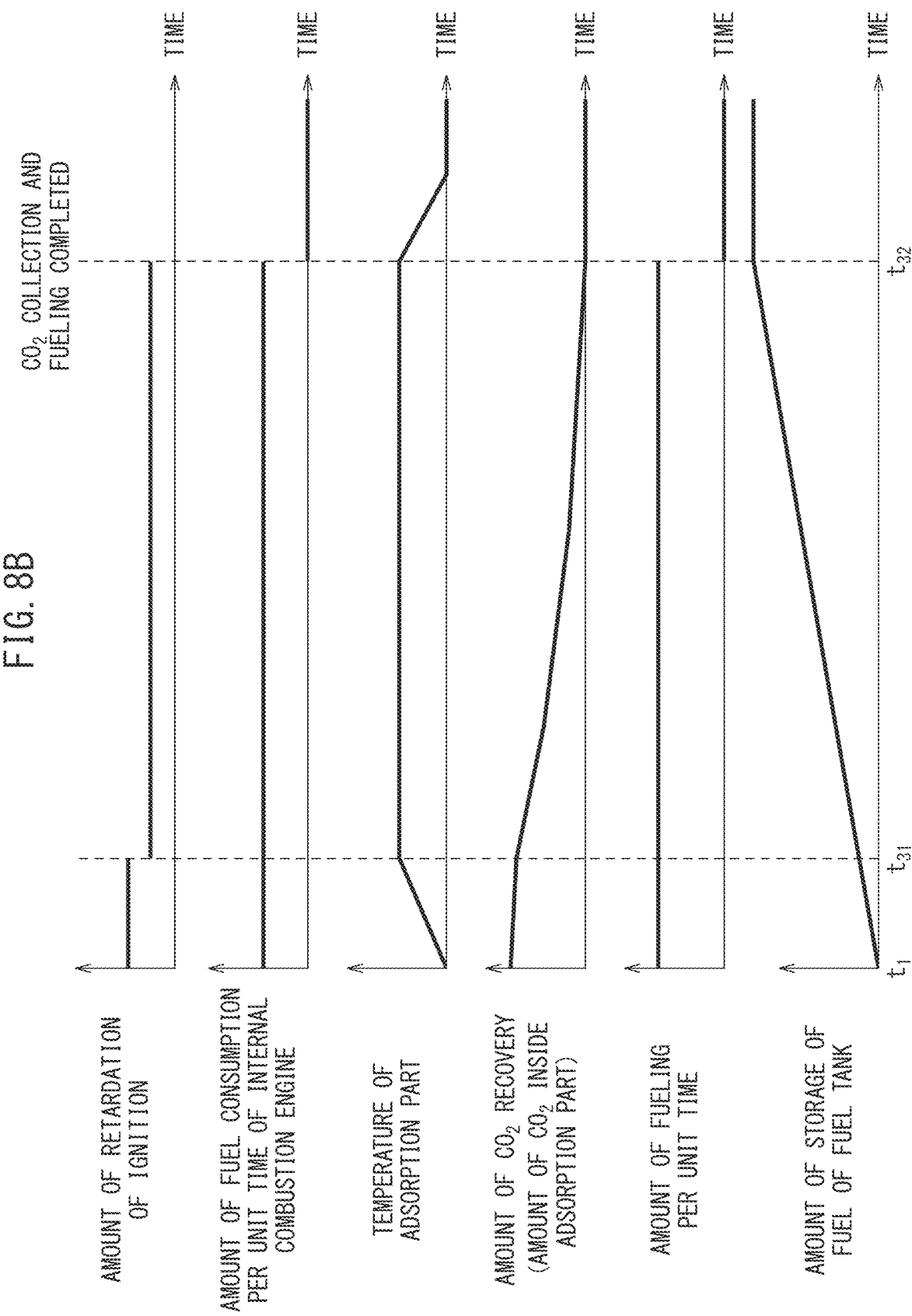

VEHICLE

RELATED APPLICATIONS

The present application claims priority of Japanese Patent Application No. 2019-154719, filed Aug. 27, 2019, the disclosure of which is hereby incorporated by reference herein in its entirety.

FIELD

The present disclosure relates to a vehicle.

BACKGROUND

Japanese Unexamined Patent Publication No. 2014-509360 discloses a conventional vehicle mounting a $CO_2$ (carbon dioxide) recovery device for recovering $CO_2$ in exhaust (exhaust gases) discharged from an internal combustion engine.

SUMMARY

In the case of a vehicle mounting an internal combustion engine and $CO_2$ recovery device, the vehicle must be provided with a fueling port for supplying fuel to a fuel tank storing fuel for the internal combustion engine and a $CO_2$ collection port for collecting $CO_2$ recovered by the $CO_2$ recovery device from the vehicle. Further, when providing a vehicle with both a fueling port and $CO_2$ collection port, how to arrange these in the vehicle has been a problem.

The present disclosure was made focusing on such a problem and has as its object placement of the fueling port and $CO_2$ collection port at the vehicle considering driver or worker friendliness in performing the work of fueling the fuel tank and the work of collecting $CO_2$ from the $CO_2$ recovery device.

To solve this problem, the vehicle according to one aspect of the present disclosure comprises a fuel tank for storing fuel, a fueling port for supplying the fuel tank with fuel, a $CO_2$ recovery device configured to recover $CO_2$, a $CO_2$ collection port for collecting $CO_2$ from the $CO_2$ recovery device, and a single openable lid configured to cover both of the fueling port and $CO_2$ collection port.

According to the vehicle according to this aspect of the present disclosure, the fueling port and $CO_2$ collection port are covered by a single lid, so when performing the fueling work and $CO_2$ collection work, the lid need only be opened and closed once. Further, it is possible to keep down the distance of movement of a worker when connecting hoses to the fueling port and $CO_2$ collection port. For this reason, it is possible to lighten the load on a worker when performing the work and as a result possible to improve the worker friendliness.

BRIEF DESCRIPTION OF DRAWINGS

FIG. 8B is a time chart explaining another example of the operation when preparing a fueling plan and $CO_2$ collection plan whereby the time of completion of filling and the time of completion of $CO_2$ collection become the same times.

DESCRIPTION OF EMBODIMENTS

Below, embodiments of the present disclosure will be explained in detail with reference to the drawings. Note that, in the following explanation, similar component elements are assigned the same reference notations.

First Embodiment

Figure 1:
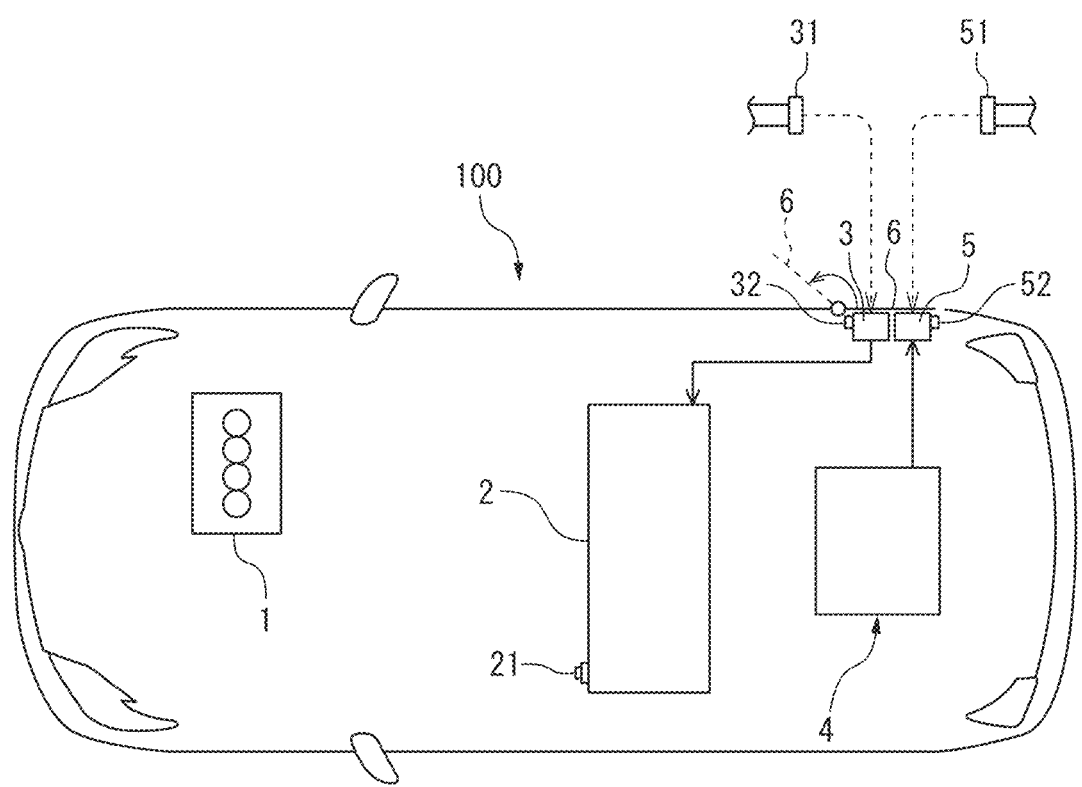
FIG. 1 is a schematic view of the configuration of a vehicle according to a first embodiment of the present disclosure.
Figure 2:
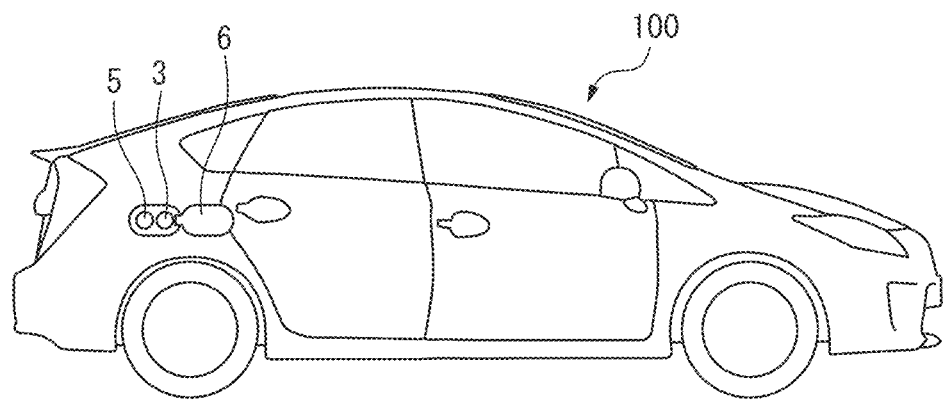
FIG. 2 is a schematic side view of the vehicle according to the first embodiment of the present disclosure.

FIG. 1 is a schematic view of the configuration of a vehicle 100 according to a first embodiment of the present disclosure showing only important parts highly relevant to the present disclosure. FIG. 2 is a schematic side view of the vehicle 100.

As shown in FIG. 1, the vehicle 100 according to the present embodiment is provided with an internal combustion engine 1, a fuel tank 2, a fueling port 3, a $CO_2$ recovery device 4, a $CO_2$ collection port 5, and a lid 6.

The internal combustion engine 1 makes fuel burn inside it to generate power for driving, for example, the vehicle 100.

The fuel tank 2 is a tank for storing fuel supplied to the internal combustion engine 1 and is configured to be able to be filled with fuel from a fueling port 3 provided at one side surface of the vehicle 100 (in the present embodiment, the side surface at the right side of the vehicle 100 in the direction of advance).

The fuel tank 2 is provided with a liquid level sensor 21 for detecting a remaining amount of fuel stored in the fuel tank 2 by detecting the height of the surface (liquid level) of the fuel stored inside the fuel tank 2 (below, called the "remaining amount of fuel"). In the present embodiment, the amount of fuel which can be filled in the fuel tank 2 (below, "amount of fuel able to be refilled") is calculated based on the detection value of this liquid level sensor 21.

The fueling port 3 is configured so as to enable connection of a fueling hose 31 for filling the fuel tank 2 with fuel from outside the vehicle. In the present embodiment, to detect the fueling port 3 having the fueling hose 31 connected to it, the fueling port 3 is provided with a fueling hose detection sensor 32.

The $CO_2$ recovery device 4 is housed inside for example a luggage space of the vehicle 100. The $CO_2$ recovery device 4 according to the present embodiment is configured to be able to recover $CO_2$ in the exhaust discharged from the internal combustion engine 1 and is configured to be able to collect the recovered $CO_2$ from the vehicle from a $CO_2$ collection port 5 provided so as to adjoin the fueling port 3 at one side surface of the vehicle 100.

The $CO_2$ collection port 5 is configured to enable connection of the collection hose 51 for collecting $CO_2$ recovered by the $CO_2$ recovery device 4 from the vehicle. In the present embodiment, to detect the connection of the collection hose 51 to the $CO_2$ collection port 5, the $CO_2$ collection port 5 is provided with a collection hose detection sensor 52.

Note that, the method of recovery of the $CO_2$ in the exhaust by the $CO_2$ recovery device 4 is not particularly limited, but, for example, the physical adsorption method or physical absorption method, chemical absorption method, cryogenic separation method, etc. explained below may be mentioned.

The physical adsorption method is the method of for example bringing activated carbon or zeolite or another solid adsorbent into contact with the gas containing $CO_2$ (in the present embodiment, exhaust) to thereby make the $CO_2$ be adsorbed at the solid adsorbent and of heating this (or reducing the pressure of this) so as to make the $CO_2$ desorb from the solid adsorbent for recovery.

The physical absorption method is the method of bringing an absorption solution able to dissolve $CO_2$ (for example, methanol or ethanol) into contact with the gas containing $CO_2$ to physically make the $CO_2$ be absorbed by the absorption solution at a high pressure and low temperature and of heating this (or reducing the pressure of this) so as to recover the $CO_2$ from the absorption solution.

The chemical absorption method is the method of bringing an absorption solution able to selectively dissolve $CO_2$ (for example, an amine) into contact with the gas containing $CO_2$ to make the $CO_2$ be absorbed by the absorption solution by a chemical reaction and of heating this so as to make the $CO_2$ disassociate from the absorption solution for recovery.

The cryogenic separation method is a method of compressing and cooling the gas containing $CO_2$ to cause the carbon dioxide to liquefy and of selectively distilling the liquefied carbon dioxide to thereby recover the carbon dioxide. Note that if employing the cryogenic separation method, if the gas containing $CO_2$ contains water vapor, the water vapor will first end up condensing and solidifying, so processing for removing water vapor from the gas containing $CO_2$ is preferably performed in advance.

In the present embodiment, as the method for recovery of the $CO_2$, the physical adsorption method is employed. The $CO_2$ recovery device 4 is configured so as to enable the zeolite used as the solid adsorbent to adsorb the $CO_2$ in the exhaust for recovery. The detailed configuration of the $CO_2$ recovery device 4 will be explained later referring to FIG. 3.

The lid 6 is an openable cover covering the outsides of the fueling port 3 and $CO_2$ collection port 5 and attached to the vehicle 100. As shown in FIG. 1 and FIG. 2, in the present embodiment, the adjacently arranged fueling port 3 and $CO_2$ collection port 5 are covered by the single lid 6.

In this way, by arranging the fueling port 3 and $CO_2$ collection port 5 adjoining each other and covering them by a single lid 6, it is possible to open and close the lid just one time when performing both the fueling work on the fuel tank 2 and the $CO_2$ collection work from the $CO_2$ recovery device 4. Further, the distance of movement of a worker when connecting both the fueling hose 31 and collection hose 51 can be kept down. For this reason, it is possible to lighten the load on the worker performing the fueling work and $CO_2$ collection work to improve the worker friendliness when performing this work.

Figure 3:
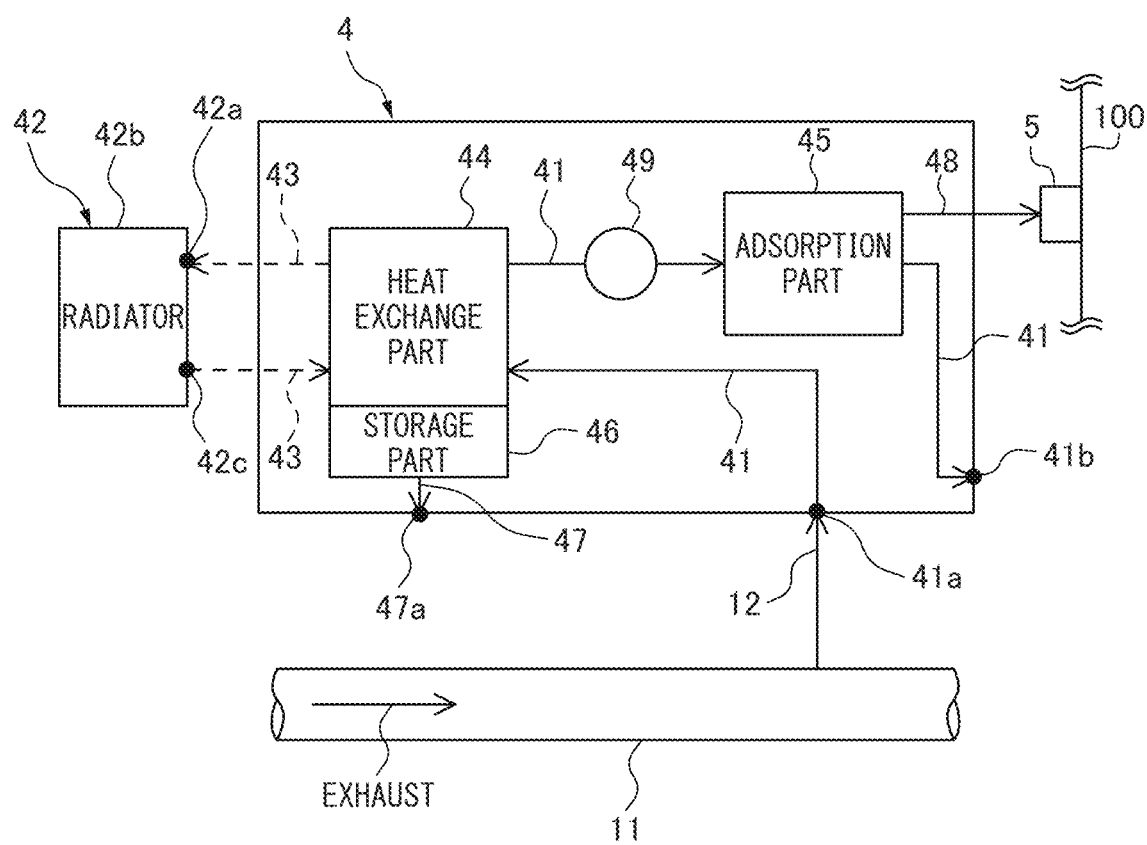
FIG. 3 is a schematic view of the configuration of a $CO_2$ recovery device according to the first embodiment of the present disclosure.

FIG. 3 is a schematic view of the configuration of a $CO_2$ recovery device 4 according to the present embodiment.

The $CO_2$ recovery device 4 is provided with a gas introduction port 41a, gas discharge port 41b, gas flow passage 41 connecting the gas introduction port 41a and gas discharge port 41b, radiator 42, cooling water circulation passage 43, heat exchange part 44 and adsorption part 45 arranged on the gas flow passage 41, storage part 46, liquid discharge port 47a, liquid flow passage 47 connecting the storage part 46 and liquid discharge port 47a, collection passage 48 connecting the adsorption part 45 and $CO_2$ collection port 5, and $CO_2$ sensor 49.

The gas introduction port 41a is an inlet for introducing gas containing $CO_2$ to the gas flow passage 41 in the $CO_2$ recovery device 4. In the present embodiment, the gas introduction port 41a is connected to the exhaust pipe 11 through a connecting pipe 12 so as to enable the exhaust flowing through the exhaust pipe 11 of the internal combustion engine 1 to be introduced from the gas introduction port 41a to the gas flow passage 41. The exhaust introduced from the gas introduction port 41a to the gas flow passage 41 flows through the gas flow passage 41 and is finally discharged from the gas discharge port 41b to outside the vehicle. Note that, in accordance with need, it is also possible to provide a shutoff valve at the connecting pipe 12 and open the shutoff valve only when introducing exhaust of the exhaust pipe 11 to the gas flow passage 41 inside the $CO_2$ recovery device 4.

The radiator 42 is provided with a cooling water inlet part 42a, core part 42b, and cooling water outlet part 42c, cools the high temperature cooling water introduced from the cooling water inlet part 42a by heat exchange at the core part 42b with, for example, air or another low temperature gas, and discharges it from the cooling water outlet part 42c.

The cooling water circulation passage 43 is a circuit for supplying cooling water discharged from the radiator 42 to the heat exchange part 44 for cooling the exhaust introduced from the $CO_2$ recovery device 4, then returning it to the radiator 42 to be recirculated. The cooling water circulation passage 43 is connected at one end to the cooling water inlet part 42a of the radiator 42 and is connected at the other end to the cooling water outlet part 42c of the radiator 42.

The heat exchange part 44 is respectively connected to the gas flow passage 41 and cooling water circulation passage 43. It is configured to exchange heat between the exhaust flowing through the gas flow passage 41 and the cooling water flowing through the cooling water circulation passage 43 and cool the exhaust flowing through the gas flow passage 41, that is, the exhaust introduced into the $CO_2$ recovery device 4.

The storage part 46 stores the condensed water formed by cooling the exhaust at the heat exchange part 44. The condensed water in the storage part 46 is discharged through the liquid flow passage 47 from the liquid discharge port 47a to the outside of the $CO_2$ recovery device 4.

The adsorption part 45 is connected to the gas flow passage 41 at the downstream side from the heat exchange part 44 so as to be able to introduce exhaust cooled by the heat exchange part 44 to the inside. The adsorption part 45 has zeolite inside it as a solid adsorbent and adsorbs $CO_2$ in the exhaust introduced through the gas flow passage 41 to the inside of the adsorption part 45. The exhaust adsorbed by $CO_2$ by the adsorption part 45 and reduced in $CO_2$ concentration flows through the gas flow passage 41 at the downstream side from the adsorption part 45 from the gas discharge port 41b to the outside air.

The collection passage 48 is a passage for collecting the $CO_2$ adsorbed at the solid adsorbent of the adsorption part 45 from the $CO_2$ collection port 5. In the present embodiment, the adsorption part 45 is heated while reducing the pressure of the adsorption part 45 to thereby cause the $CO_2$ adsorbed at the solid adsorbent to be desorbed from the solid adsorbent and suck out the desorbed $CO_2$ from the adsorption part 45 and collect it from the $CO_2$ collection port 5. Note that, as needed, it is also possible to provide a shutoff valve in the collection passage 48 and open the shutoff valve only when collecting $CO_2$.

The $CO_2$ sensor 49 is provided in the gas flow passage 41 between the heat exchange part 44 and the adsorption part 45 and detects the flow rate of the exhaust introduced to the adsorption part 45 and the $CO_2$ concentration in the exhaust. In the present embodiment, based on the exhaust flow and $CO_2$ concentration detected by this $CO_2$ sensor 49, the amount of $CO_2$ adsorbed at the adsorption part 45, that is, the amount of $CO_2$ recovered by the vehicle 100 (below, referred to as the "amount of $CO_2$ recovery"), is calculated.

The above-explained vehicle 100 according to the present embodiment is provided with the fuel tank 2 storing fuel, the fueling port 3 for supplying the fuel tank 2 with fuel, the $CO_2$ recovery device 4 recovering the $CO_2$, the $CO_2$ collection port 5 for collecting $CO_2$ from the $CO_2$ recovery device 4, and the single openable lid 6 covering both the fueling port 3 and $CO_2$ collection port 5.

By arranging the fueling port 3 and $CO_2$ collection port 5 adjoining each other and cover these by a single lid 6, it is possible to open and close the lid only once when performing the fueling work and $CO_2$ collection work. Further, it is possible to keep down the distance of movement of a worker when connecting the fueling hose 31 and collection hose 51. For this reason, it is possible to lighten the load of the worker when performing the fueling work and $CO_2$ collection work to improve the worker friendliness at the time of the work.

Second Embodiment

Next, a second embodiment of the present disclosure will be explained. The present embodiment differs from the first embodiment on the point integrally joining the fueling port 3 and $CO_2$ collection port 5. Below, this point of difference will be focused on in the explanation.

Figure 4A:
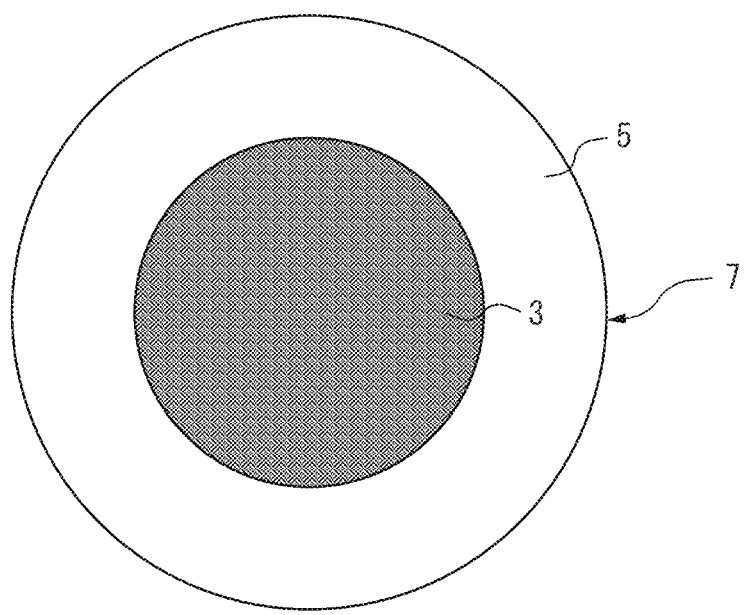
FIG. 4A is a view showing an example of an integral type connection port comprising a fueling port and $CO_2$ collection port which are integrally joined.
Figure 4B:
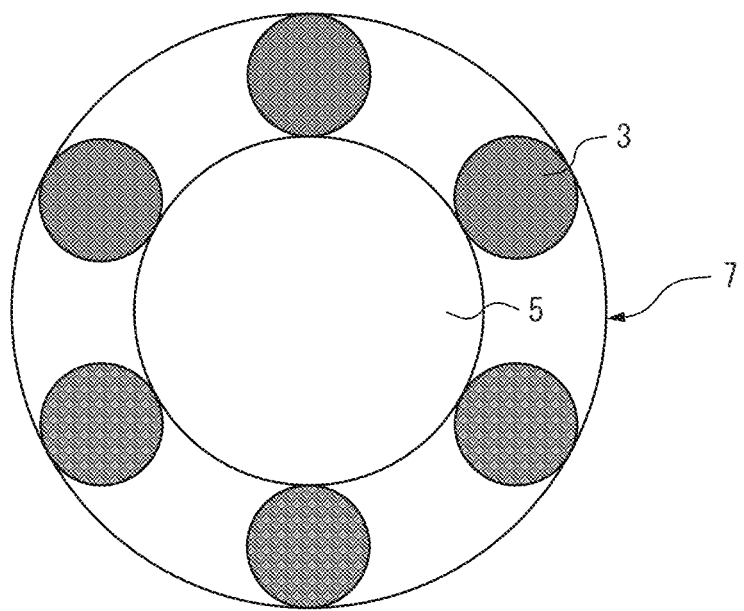
FIG. 4B is a view showing an example of an integral type connection port comprising a fueling port and $CO_2$ collection port which are integrally joined.

FIG. 4A and FIG. 4B are views showing an example of an integral type connection port 7 comprised of the fueling port 3 and $CO_2$ collection port 5 which are integrally joined.

As shown in FIG. 4A and FIG. 4B, in the present embodiment, the fueling port 3 and $CO_2$ collection port 5 are made an integral type connection port 7 which integrally joins the same. At this integral type connection port 7, an integral type hose (not shown) comprised of the fueling hose 31 and collection hose 51 joined together (not shown) can be connected.

The integral type connection port 7, for example, as shown in FIG. 4A, can be made a shape with the $CO_2$ collection port 5 formed around the fueling port 3. Further, for example, as shown in FIG. 4B, it may be made a shape with the fueling port 3 formed around the $CO_2$ collection port 5.

The fueling port 3 and $CO_2$ collection port 5 of the above explained vehicle 100 according to the present embodiment is made the integral type connection port 7 comprised of the fueling port 3 and $CO_2$ collection port 5 which are joined together. The integral type connection port 7 is configured to enable connection with an integral type hose comprised of the fueling hose 31 connected to the fueling port 3 and the collection hose 51 connected to the $CO_2$ collection port 5 which are joined together.

Due to this, the work of connection of the fueling hose 31 and collection hose 51 can be performed once, so it is possible to further improve the worker friendliness in both the work of filling the fuel tank 2 and the $CO_2$ collection work from the $CO_2$ recovery device 4.

Third Embodiment

Next, a third embodiment of the present disclosure will be explained. The present embodiment differs from the above embodiments on the point relating to the content of the processing performed when performing the fueling work and $CO_2$ collection work. Below, one example of the content of the processing performed when performing the different work at a facility 200 able to perform the fueling work and $CO_2$ collection work (below, referred to as a "service station") will be explained focusing on the point of difference.

Figure 5:
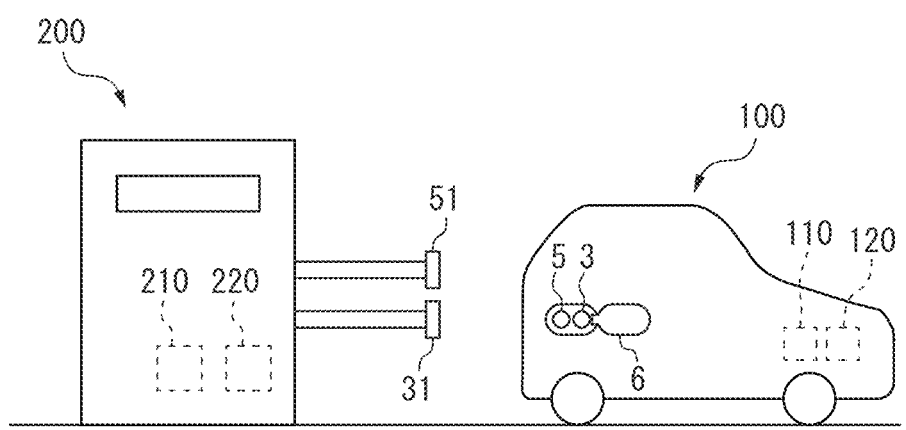
FIG. 5 is a schematic view of the configuration of a vehicle and service station according to a third embodiment of the present disclosure.

FIG. 5 is a schematic view of the configuration of the vehicle 100 and service station 200 according to the present embodiment.

As shown in FIG. 5, the vehicle 100 according to the present embodiment is further provided with a vehicle-side communication device 110 and vehicle-side control device 120.

The vehicle-side communication device 110 is a wireless communication device configured to be able to wirelessly communicate with a later explained service station-side communication device 210 provided at the service station 200 side and is provided with an antenna and a signal processing circuit performing various types of processing relating to wireless communication such as the modulation and demodulation of a wireless signal.

The vehicle-side control device 120 is a microcomputer provided with a central processing unit (CPU), read only memory (ROM), random access memory (RAM), input port, and output port connected with each other by a bidirectional bus.

The vehicle-side control device 120 receives as input signals from the above-mentioned liquid level sensor 21 or fueling hose detection sensor 32, collection hose detection sensor 52, $CO_2$ sensor 49, etc. Further, the vehicle-side control device 120 calculates the amount of fuel able to refilled in the fuel tank 2 based on a signal from the liquid level sensor 21. Further, the vehicle-side control device 120 detects whether the different hoses 31, 51 are connected based on signals from the fueling hose detection sensor 32 and collection hose detection sensor 52. Further, the vehicle-side control device 120 calculates the amount of $CO_2$ recovery based on a signal from the $CO_2$ sensor 49. Further, the vehicle-side control device 120 controls the internal combustion engine 1 to introduce the high temperature exhaust to the adsorption part 45 when collecting $CO_2$ from the $CO_2$ recovery device 4. Due to this, the adsorption part 45 is heated to make the $CO_2$ adsorbed at the solid adsorbent of the adsorption part 45 desorb from the solid adsorbent.

The service station 200 is provided with a service station-side communication device 210 and a service station-side control device 220.

The service station-side communication device 210 is a wireless communication device configured to be able to wirelessly communicate with the vehicle-side communication device 110 and is provided with an antenna and a signal processing circuit performing various types of processing relating to wireless communication of modulation and demodulation of a wireless signal.

The service station-side control device 220 is a microcomputer provided with a central processing unit (CPU), read only memory (ROM), random access memory (RAM), input port, and output port connected with each other by a bidirectional bus.

The service station-side control device 220 controls the amount of fueling of the fuel tank 2 and the amount of collection of $CO_2$ from the $CO_2$ recovery device 4 when performing the fueling work and $CO_2$ collection work in a coordinated manner.

Note that, the various type of information (data) generated at the service station-side control device 220 received by the vehicle-side communication device 110 from the service station-side communication device 210 is input through the vehicle-side communication device 110 to the vehicle-side control device 120. Further, the various type of information (data) generated at the vehicle-side control device 120 received by the service station-side communication device 210 from the vehicle-side communication device 110 is input through the service station-side communication device 210 to the service station-side control device 220.

Figure 6:
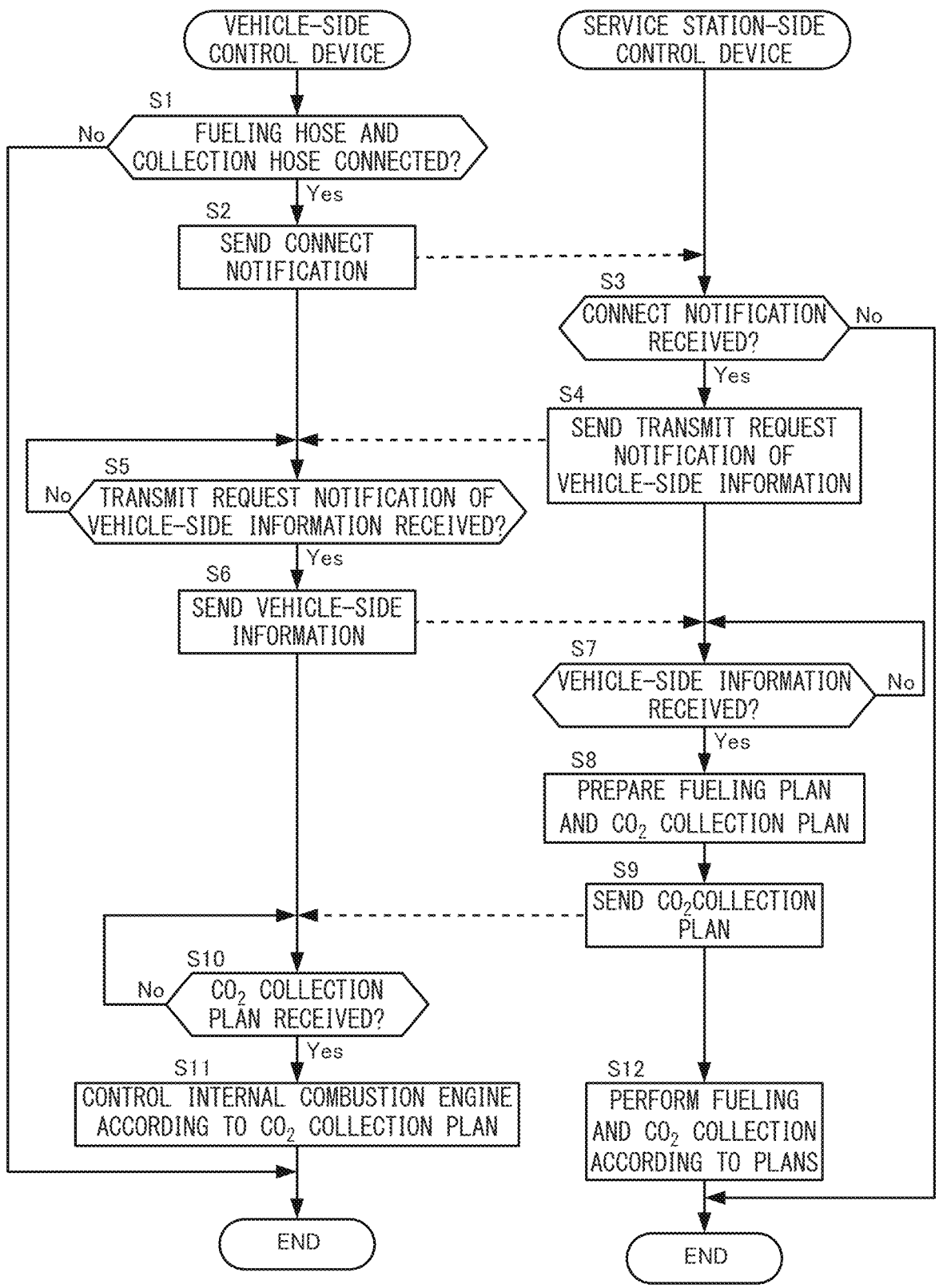
FIG. 6 is a flow chart explaining the content of processing according to the third embodiment of the present disclosure performed by the vehicle-side control device and service station-side control device when performing fueling work and $CO_2$ collection work at a service station.

FIG. 6 is a flow chart for explaining the content of processing performed by the vehicle-side control device 120 and service station-side control device 220 when performing the fueling work and $CO_2$ collection work at the service station 200.

At step S1, the vehicle-side control device 120 detects if the fueling hose 31 and collection hose 51 have been connected to the fueling port 3 and $CO_2$ collection port 5. The vehicle-side control device 120 proceeds to step S2 if the hoses 31, 51 have been connected to the fueling port 3 and $CO_2$ collection port 5. On the other hand, the vehicle-side control device 120 ends the current processing if the hoses 31, 51 have not been connected to the fueling port 3 and $CO_2$ collection port 5.

At step S2, the vehicle-side control device 120 sends a connect notification for notifying the service station 200 side that the hoses 31, 51 have been connected to the fueling port 3 and $CO_2$ collection port 5 to the service station-side communication device 210 through the vehicle-side communication device 110.

At step S3, the service station-side control device 220 judges if it has received the connect notification. The service station-side control device 220 proceeds to step S4 if receiving the connect notification. On the other hand, the service station-side control device 220 ends the current processing if not receiving the connect notification.

At step S4, the service station-side control device 220 sends a transmit request notification of the vehicle-side information through the service station-side communication device 210 to the vehicle-side communication device 110.

At step S5, the vehicle-side control device 120 judges if it has received the transmit request notification of the vehicle-side information. The vehicle-side control device 120 proceeds to the processing of step S6 if receiving the transmit request notification of the vehicle-side information. On the other hand, the vehicle-side control device 120 again judges if it has received the transmit request notification of the vehicle-side information after waiting for a predetermined time if not receiving the transmit request notification of the vehicle-side information. Note that, when not able to receive the transmit request notification even when a certain time has elapsed from when sending the connect notification, it is possible to resend the connect notification or end the processing once.

At step S6, the vehicle-side control device 120 sends the vehicle-side information through the vehicle-side communication device 110 to the service station-side communication device 210. The vehicle-side information includes the amount of fuel able to be refilled and amount of $CO_2$ recovery calculated by the vehicle-side control device 120 and other data.

At step S7, the service station-side control device 220 judges if it has received the vehicle-side information. The service station-side control device 220 proceeds to the processing of step S8 if receiving the vehicle-side information. On the other hand, the service station-side control device 220 again judges if it has received the vehicle-side information after waiting for a predetermined interval if not receiving the vehicle-side information. Note that, when not able to receive the vehicle-side information even after a certain time elapses from when sending the transmit request notification of the vehicle-side information, it is possible to resend the transmit request notification of the vehicle-side information or to end the processing once.

At step S8, the service station-side control device 220 prepares a fueling plan and $CO_2$ collection plan based on the amount of fuel able to be refilled and amount of $CO_2$ recovery contained in the vehicle-side information.

Here, in the present embodiment, when collecting $CO_2$ from the $CO_2$ recovery device 4, the internal combustion engine 1 is operated to introduce high temperature exhaust to the adsorption part 45 to heat the adsorption part 45 so as to make the $CO_2$ desorb from the solid adsorbent of the adsorption part 45.

For this reason, the fueling plan is made a plan setting for example the amount of fueling per unit time and fueling time period etc. so as to enable the amount of fuel required making the amount of fuel stored in the fuel tank 2 the amount of fuel stored which the worker demands plus the amount of fuel consumed by the internal combustion engine 1 during the $CO_2$ collection work to be supplied to the fuel tank 2, for example, the amount of fueling per unit time and fueling time period etc.

Further, the $CO_2$ collection plan is a plan setting the load, operating time, etc. of the internal combustion engine 1 so as to enable recovery of the $CO_2$ recovered by the $CO_2$ recovery device 4 (that is, $CO_2$ of the amount of $CO_2$ recovery) linked with fueling.

Note that in the present embodiment, the plans are prepared so that the fueling time and $CO_2$ collection time become the shortest. That is, the plans are prepared so that the time of completion of filling and the time of completion of $CO_2$ collection become the earliest times. However, the disclosure is not limited to this. The plans may also be prepared so that the time of completion of filling and the time of completion of $CO_2$ collection become the same times.

At step S9, the service station-side control device 220 sends the $CO_2$ collection plan through the service station-side communication device 210 to the vehicle-side communication device 110.

At step S10, the vehicle-side control device 120 judges if the $CO_2$ collection plan has been received. The vehicle-side control device 120 proceeds to the processing of step S11 if receiving the $CO_2$ collection plan. On the other hand, if not receiving $CO_2$ collection plan, the vehicle-side control device 120 again judges if it has received the $CO_2$ collection plan after a predetermined interval has passed. Note that, the device may resend the vehicle-side information and end the processing once if not able to receive the $CO_2$ collection plan even after a certain time has elapsed from when sending the vehicle-side information.

At step S11, the vehicle-side control device 120 operates the internal combustion engine 1 in accordance with the $CO_2$ collection plan and thereby introduces high temperature exhaust to the adsorption part 45 to make the $CO_2$ be desorbed from the solid adsorbent of the adsorption part 45.

At step S12, the service station-side control device 220 performs fueling in accordance with the fueling plan and sucks out $CO_2$ from the adsorption part 45 through the collection hose 51 to collect $CO_2$ recovered by the $CO_2$ recovery device 4 in accordance with the $CO_2$ collection plan.

Figure 7:
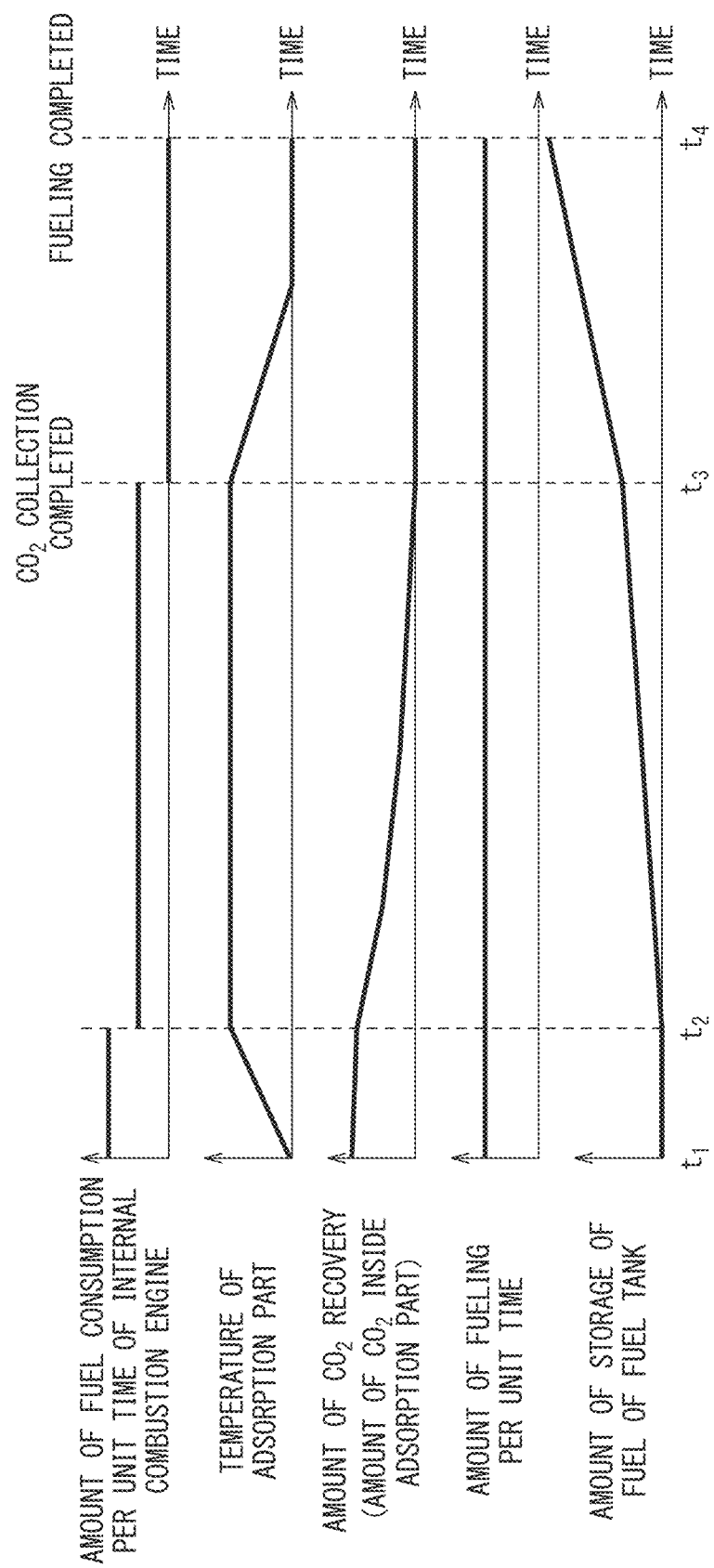
FIG. 7 is a time chart explaining one example of the operation when preparing a fueling plan and $CO_2$ collection plan whereby the time of completion of filling and the time of completion of $CO_2$ collection become the earliest times.

FIG. 7 is a time chart for explaining one example of the operation when preparing the plans so that the time of completion of filling and the time of completion of $CO_2$ collection respectively become the earliest times.

At the time t1, filling of the fuel tank 2 and collection of $CO_2$ from the $CO_2$ recovery device 4 are respectively started in accordance with the plans. In the example shown in FIG. 7, the fueling plan is made a plan making the amount of fueling the fuel tank 2 per unit time until the fueling is completed a fixed amount.

In the period from the time t1 to the time t2, to make the temperature of the adsorption part 45 quickly rise, the internal combustion engine 1 is made to operate at a high load using all of the fuel supplied to the fuel tank 2 in accordance with the $CO_2$ collection plan. At this time, there is no need to take out the output of the internal combustion engine 1 as power, so in the present embodiment, for example, the internal combustion engine 1 is operated while delaying the ignition timing and firing timing etc. from usual so that the internal combustion engine 1 discharges high temperature exhaust. Further, along with this, the air-fuel ratio is controlled to the stoichiometric ratio while controlling the combustion temperature to a suitable temperature (for example, 1500K to 2000K) and the internal combustion engine 1 is operated so that the amount of discharge of nitrogen oxides and other air pollutants from the internal combustion engine 1 becomes smaller.

Due to this, the temperature of the adsorption part 45 gradually rises. The $CO_2$ gradually desorbed from the adsorption part 45 along with the temperature rise of the adsorption part 45 is collected through the collection hose 51 whereby the amount of $CO_2$ recovery gradually decreases.

At the time t2, to maintain the temperature of the adsorption part 45 which was raised in temperature at a certain level, part of the fuel supplied to the fuel tank 2 is used to make the internal combustion engine 1 operate by a low to middle load in accordance with the $CO_2$ collection plan.

Due to this, at the time t2 on, the excess fuel not used for operating the internal combustion engine 1 is stored in the fuel tank 2, so the amount of fuel storage of the fuel tank 2 gradually increases. Further, at the time t2 and on, the temperature of the adsorption part 45 is maintained at a certain temperature whereby the $CO_2$ desorbed from the solid adsorbent of the adsorption part 45 is collected through the collection hose 51. Due to this, the amount of $CO_2$ recovery decreases. At this time, the amount of desorption of $CO_2$ per unit time desorbed from the solid adsorbent of the adsorption part 45 (below, referred to as the "amount of $CO_2$ desorption") basically depends on the temperature of the adsorption part 45 and the amount of adsorption of $CO_2$ adsorbed at the solid adsorbent (below, referred to as the "amount of $CO_2$ adsorption"). The higher the temperature of the adsorption part 45 and, further, the greater the amount of $CO_2$ adsorption, the greater this tends to become. For this reason, at the time t2 and on, the temperature of the adsorption part 45 is maintained at a certain temperature, so the amount of $CO_2$ desorption basically depends on the amount of $CO_2$ adsorption (amount of $CO_2$ recovery). Along with the desorption of $CO_2$ from the solid adsorbent, the amount of $CO_2$ adsorption decreases and the amount of $CO_2$ desorption decreases, so as shown in FIG. 7, along with the elapse of time from the time t2 and the approach to the time t3, the amount of decrease of the amount of $CO_2$ recovery becomes slower.

At the time t3, according to the $CO_2$ collection plan, operation of the internal combustion engine 1 is made to stop. By following the plans, basically, at the timing of this time t3, the amount of $CO_2$ recovery becomes zero and collection of $CO_2$ from the $CO_2$ recovery device 4 is completed. At the time t3 and on, along with the operation of the internal combustion engine 1 being stopped, all of the fuel supplied to the fuel tank 2 is stored in the fuel tank 2, so the amount of storage of fuel in the fuel tank 2 quickly increases.

At the time t4, in accordance with the fueling plan, the filling of the fuel tank 2 is stopped. By following the plans, basically, at the timing of this time t4, the amount of fuel stored in the fuel tank 2 becomes the amount of fuel storage demanded by the worker and the fueling is completed.

Figure 8A:
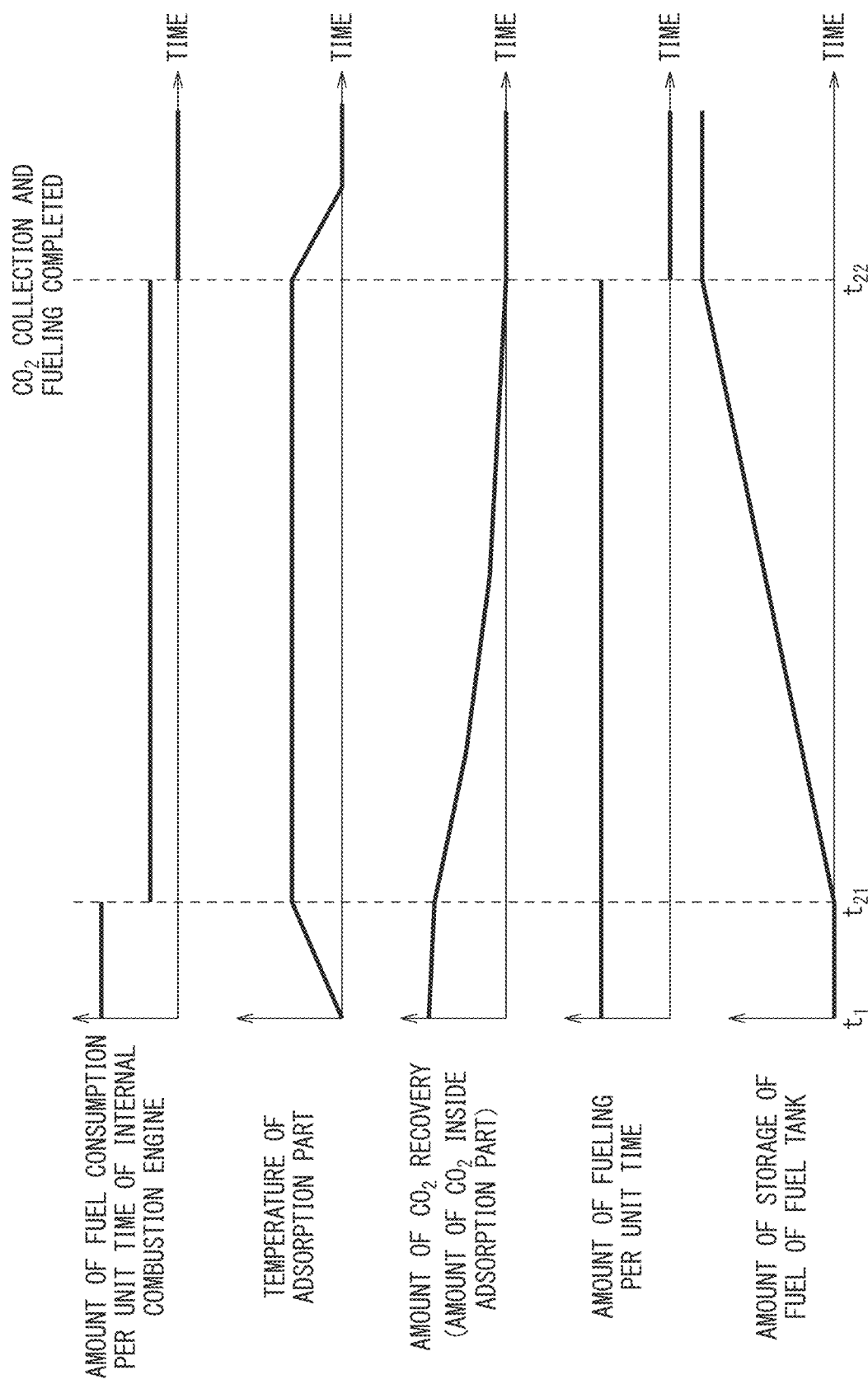
FIG. 8A is a time chart explaining one example of the operation when preparing a fueling plan and $CO_2$ collection plan whereby the time of completion of filling and the time of completion of $CO_2$ collection become the same times.

FIG. 8A is a time chart for explaining one example of the operation in the case of preparing the plans so that the time of completion of filling and the time of completion of $CO_2$ collection become the same times.

In the example shown in FIG. 8A as well, in the same way as the above-mentioned FIG. 7, at the time t1, in accordance with the plans, filling of the fuel tank 2, and collection of $CO_2$ from the $CO_2$ recovery device 4 are respectively started.

At this time, in the example shown in FIG. 8A, the time of completion of filling and the time of completion of $CO_2$ collection are made the same times, so even compared with the case of the above-mentioned FIG. 7, the time period when using all of the fuel supplied to the fuel tank 2 to make the internal combustion engine 1 operate at a high load is shortened. Further, at the time t21 and on, the load when using part of the fuel supplied to the fuel tank 2 to make the internal combustion engine 1 operate is made lower than the above-mentioned case of FIG. 7 (that is, the amount of fuel consumption of the internal combustion engine 1 is made smaller than the above-mentioned case of FIG. 7). Due to this, at the time t21 and on, the temperature of the adsorption part 45 is maintained at a certain temperature lower than the above-mentioned case of FIG. 7 to keep down the amount of $CO_2$ desorbed from the adsorption part 45 and make the time of completion of filling and the time of completion of $CO_2$ collection the same time of the time t22.

FIG. 8B is a time chart explaining another example of the operation when preparing the plans so that the time of completion of filling and the time of completion of $CO_2$ collection become the same times.

In the example shown in FIG. 8B as well, at the time t1, in accordance with the plans, filling of the fuel tank 2 and collection of $CO_2$ from the $CO_2$ recovery device 4 are respectively started, but in the example shown in FIG. 8B, from the time t1, part of the fuel supplied to the fuel tank 2 is used to make the internal combustion engine 1 operate by a low to middle load. The amount of retardation of ignition is controlled to control the temperature of the exhaust discharged from the internal combustion engine 1, that is, the temperature of the exhaust introduced to the adsorption part 45, to thereby control the amount of $CO_2$ desorbed from the adsorption part 45.

Specifically, until the time t31, the amount of retardation of ignition is maximized to make the temperature of the adsorption part 45 quickly increase while at the time t31 and on, the amount of retardation of ignition is made smaller to thereby maintain the temperature of the adsorption part 45 at a certain temperature lower than the above-mentioned case of FIG. 7 and keep down the amount of $CO_2$ desorbed from the adsorption part 45 and make the time of completion of filling and the time of completion of $CO_2$ collection the same time of the time t32.

The above-mentioned vehicle 100 according to the present embodiment is further provided with the internal combustion engine 1 and the vehicle-side control device 120 (control device). The $CO_2$ recovery device 4 is configured to be able to recover the $CO_2$ in the exhaust discharged from the internal combustion engine 1. Further, the vehicle-side control device 120 is configured to control the internal combustion engine 1 so that high temperature exhaust is discharged from the internal combustion engine 1 when collecting $CO_2$ from the $CO_2$ recovery device 4 and heat the $CO_2$ recovery device 4 by introducing high temperature exhaust into the $CO_2$ recovery device 4.

Due to this, when collecting $CO_2$ from the $CO_2$ recovery device 4, the service station 200 side does not have to heat the $CO_2$ recovery device 4. It is sufficient to just perform fueling, so the facilities at the service station 200 side can be simplified.

Further, the service station 200 according to the present embodiment is provided with a service station-side communication device 210 receiving vehicle-side information including an empty volume of the fuel tank 2 (amount of fuel to be refilled) and the amount of $CO_2$ recovery of the $CO_2$ recovery device 4 sent from the vehicle-side communication device 110 mounted in the vehicle 100 and a service station-side control device 220 configured to control the amount of supply of fuel to the fuel tank 2 and the amount of collection of $CO_2$ from the $CO_2$ recovery device 4 based on the vehicle-side information so that the time of completion of filling of the fuel tank 2 and the time of completion of collection of $CO_2$ from the $CO_2$ recovery device 4 become the same times.

In this way, by making the time of completion of filling of the fuel tank 2 and the time of completion of collection of $CO_2$ from the $CO_2$ recovery device 4 the same, it is possible to eliminate the occurrence of a wait time etc. after one is completed, so it is possible to keep the occurrence of a wait time from causing a vehicle occupant or other worker to feel dissatisfied.

Fourth Embodiment

Next, a fourth embodiment of the present disclosure will be explained. The present embodiment differs from the above-mentioned embodiments on the point of the worker performing the fueling work and $CO_2$ collection work being able to be provided with various types of information. Below, this point of difference will be focused on in the explanation.

Figure 9:
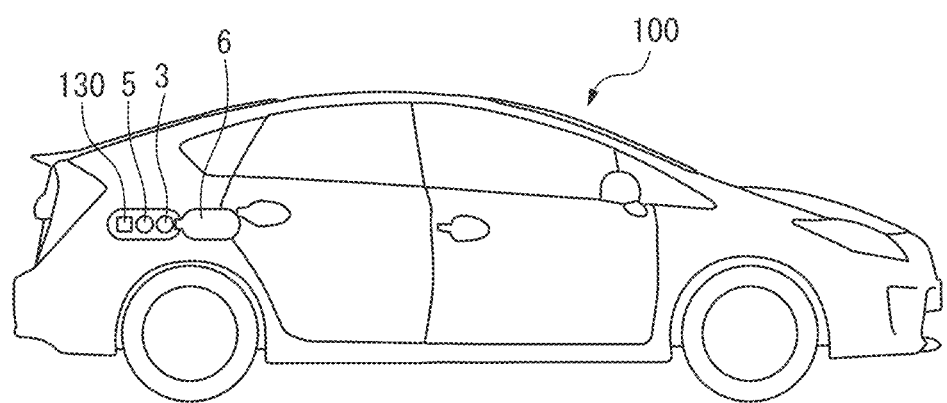
FIG. 9 is a schematic side view of the vehicle according to a fourth embodiment of the present disclosure.

FIG. 9 is a schematic side view of the vehicle 100 according to the present embodiment.

The vehicle 100 according to the present embodiment is provided with a display part 130 for providing various types of information to a worker performing the fueling work and $CO_2$ collection work.

The display part 130 is, for example, any of various types of displays such as a touch panel. The display part 130 is placed at a position which the worker can view. In the present embodiment, the display part 130, as shown in FIG. 9, is arranged at a position adjoining the fueling port 3 and $CO_2$ collection port 5 so as to enable a worker to view it when the lid 6 is opened.

The display part 130 displays information corresponding to a signal output from the vehicle-side control device 120 (for example, text information or graphic information). Further, in the present embodiment, the display part 130 is made able to display the time of completion of filling and the time of completion of $CO_2$ collection. Due to this, a worker can obtain a grasp of the time of the end of the fueling work and $CO_2$ collection work. For this reason, the worker friendliness when performing the fueling work and $CO_2$ collection work can be further improved.

Figure 10:
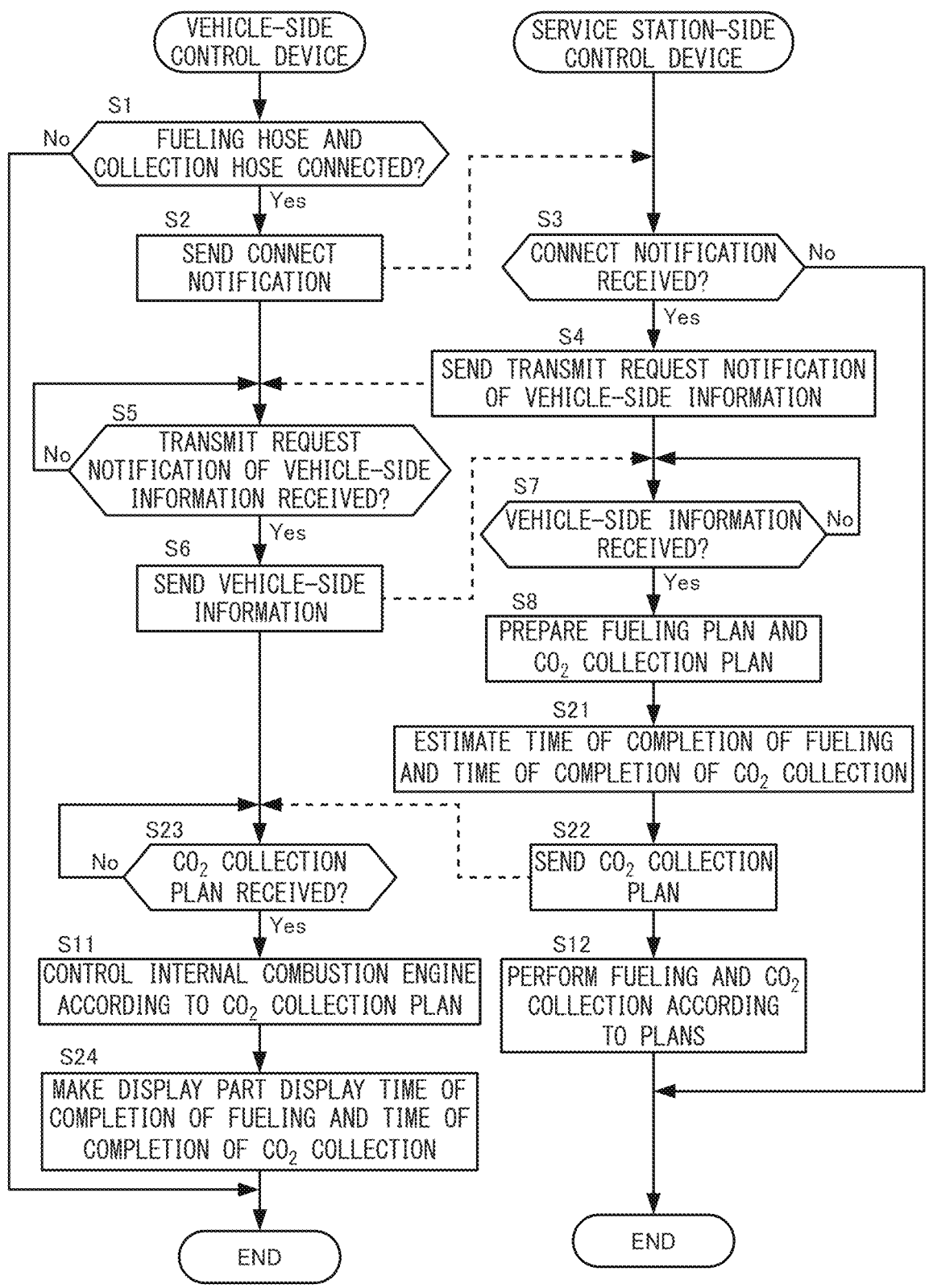
FIG. 10 is a flow chart explaining the content of processing according to the fourth embodiment of the present disclosure performed by the vehicle-side control device and service station-side control device when performing fueling work and $CO_2$ collection work at a service station.

FIG. 10 is a flow chart explaining the content of the processing according to the present embodiment performed by the vehicle-side control device 120 and service station-side control device 220 when the fueling work and $CO_2$ collection work are performed at the service station 200. Note that, in FIG. 10, the content of the processing of step S1 to step S8, step S11, and step S12 is similar to the third embodiment, so here the explanation will be omitted.

As shown in the flow chart of FIG. 10, the service station-side control device 220 estimates the time of completion of filling when filling of the fuel tank 2 in accordance with the fueling plan based on the amount of fuel able to be refilled and estimates the time of completion of $CO_2$ collection when collecting $CO_2$ in accordance with the $CO_2$ collection plan based on the amount of recovery of $CO_2$ and sends the time of completion of filling and the time of completion of $CO_2$ collection together with the $CO_2$ collection plan to the vehicle-side control device 120 (S21, S22).

Figure 11:
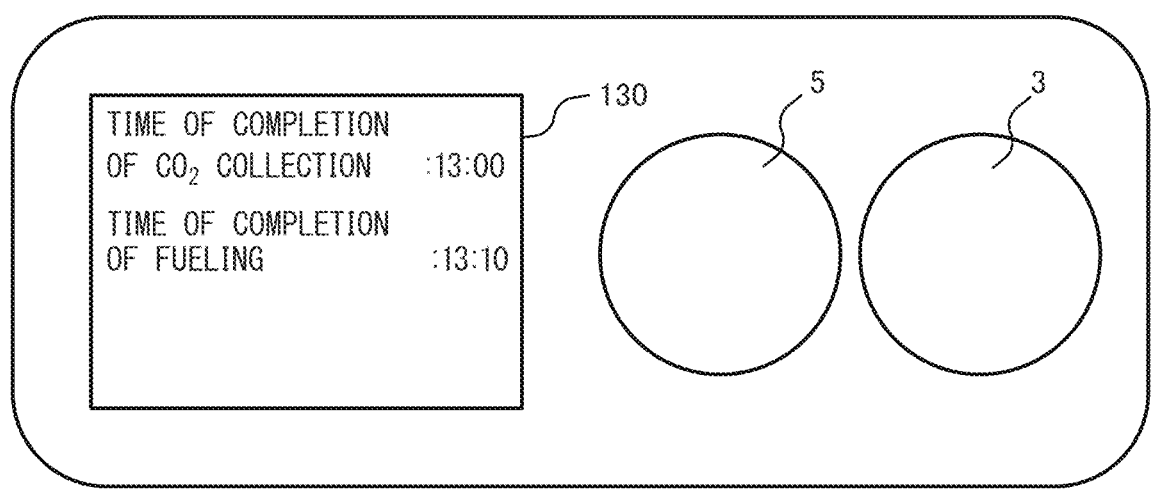
FIG. 11 shows one example of a screen displaying a time of completion of filling and a time of completion of $CO_2$ collection.

Further, if receiving the $CO_2$ collection plan, the vehicle-side control device 120 makes the display part 130 display, for example, as shown in FIG. 11, time of completion of filling and the time of completion of $CO_2$ collection received together with the $CO_2$ collection plan (at S23, Yes, S24).

The above-explained vehicle 100 according to the present embodiment is further provided with a display part 130 for providing information to a worker performing the work of filling the fuel tank 2 and work of collecting $CO_2$ from the $CO_2$ recovery device 4, a vehicle-side communication device 110 (communication device) configured to be able to communicate with a service station 200 for supplying a fuel tank 2 with fuel and for collecting $CO_2$ from the $CO_2$ recovery device 4, and a vehicle-side control device 120 (control device). Further, the vehicle-side control device 120 is configured so as to make the display part 130 display information relating to the time of completion of filling of the fuel tank 2 and the time of completion of collection of $CO_2$ from the $CO_2$ recovery device 4 received from the service station 200 side through the vehicle-side communication device 110.

Due to this, a worker performing the fueling work and $CO_2$ collection work can obtain a grasp of the times of ending the work. For this reason, the worker friendliness in the fueling work and $CO_2$ collection work can be further improved. In particular, in the present embodiment, the display part 130 is arranged at a position adjoining the fueling port 3 and $CO_2$ collection port 5, so the display part 130 can be viewed during the fueling work and $CO_2$ collection work. For this reason, it is possible to easily check various types of information, so it is possible to further improve the worker friendliness when performing the work.

Note that in the present embodiment, the display part 130 provided at the vehicle 100 was made to display the time of completion of filling and the time of completion of $CO_2$ collection, but the disclosure is not limited to this. A mobile terminal of an occupant of the vehicle 100 or a worker may be made to communicate with the service station-side communication device 210 to make the mobile terminal receive the time of completion of filling and the time of completion of $CO_2$ collection and make the mobile terminal display the time of completion of filling and the time of completion of $CO_2$ collection.

That is, the mobile terminal may be configured provided with a display part for displaying information, a communication device configured to be able to communicate with a service station 200 for supplying the fuel tank 2 with fuel and collecting $CO_2$ from the $CO_2$ recovery device 4, and a processing device configured to make the display part display information relating to the time of completion of filling and the time of completion of $CO_2$ collection received from the service station 200 side through the communication device. In the mobile terminal, the display part can, for example, be made any of various types of display such as a touch panel. Further, the communication device can, for example, be made a wireless communication device provided with an antenna and a signal processing circuit performing various types of processing relating to wireless communication such as modulation and demodulation of the wireless signal. Further, the processing device can be made a microcomputer provided with a central processing unit (CPU), read only memory (ROM), random access memory (RAM), input port, and output port connected with each other by a bidirectional bus.

Fifth Embodiment

Next, a fifth embodiment of the present disclosure will be explained. The present embodiment differs from the fourth embodiment on the point of making the display 130 display in a selectable state whether to complete both filling of the fuel tank 2 and collection of $CO_2$ or end the filling of the fuel tank 2 and collection of $CO_2$ at the point of time when either of these is completed when the time of completion of filling and the time of completion of $CO_2$ collection differ. Below, this point of difference will be focused on in the explanation.

Figure 12:
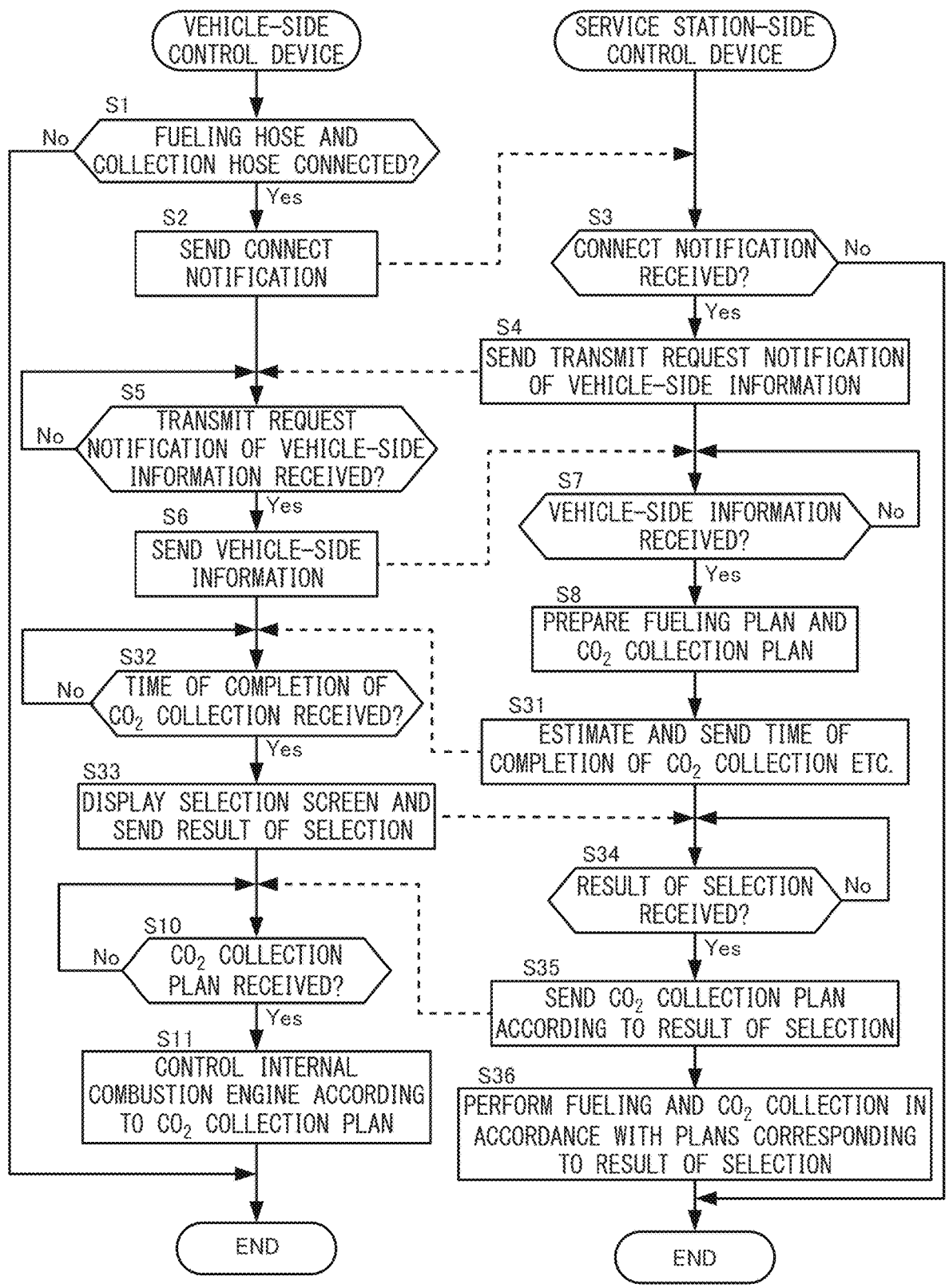
FIG. 12 is a flow chart explaining the content of processing according to a fifth embodiment of the present disclosure performed by the vehicle-side control device and service station-side control device when performing fueling work and $CO_2$ collection work at a service station.

FIG. 12 is a flow chart explaining the content of processing according to the present embodiment performed by the vehicle-side control device 120 and service station-side control device 220 when performing both of the fueling work and $CO_2$ collection work at the service station 200. Note that, in FIG. 12, the content of the processing of step S1 to step S8, step S10, and step S11 is similar to the third embodiment, so here the explanation will be omitted.

As shown in the flow chart of FIG. 12, after preparation of the fueling plan and $CO_2$ collection plan, the service station-side control device 220 estimates the time of completion of filling and the time of completion of $CO_2$ collection according to the same and sends the estimates to the vehicle-side control device 120 (S8, S31).

Further, when receiving the time of completion of filling and the time of completion of $CO_2$ collection, the vehicle-side control device 120 makes the display part 130 display a selection screen displaying predetermined options and sends the result of selection by the worker to the service station-side control device 220 (at S32, Yes, S33).

Figure 13:
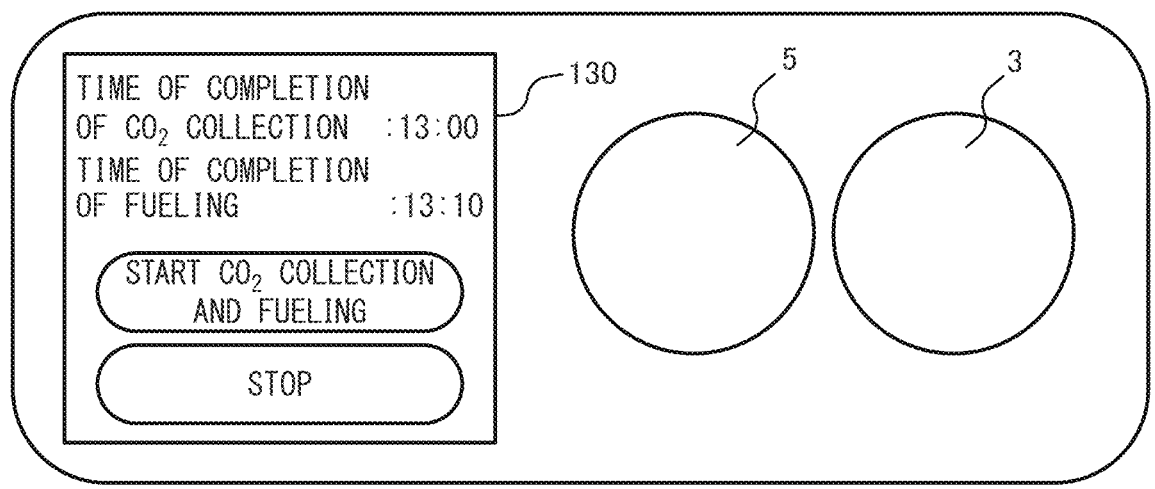
FIG. 13 is a view showing one example of a selection screen.

If the time of completion of filling and the time of completion of $CO_2$ collection are the same times, for example, as shown in FIG. 13, the selection screen can be made a screen which displays the time of completion of filling and the time of completion of $CO_2$ collection and displays the option of seeking permission for starting fueling and collection of $CO_2$.

Figure 14:
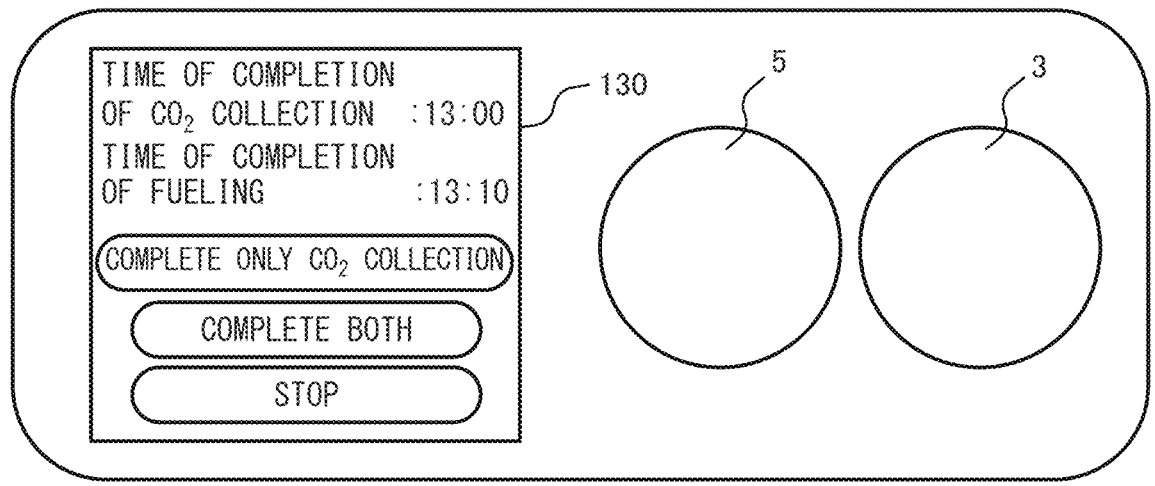
FIG. 14 is a view showing one example of a selection screen.

Further, the selection screen may be made a screen displaying, for example, as shown in FIG. 14, at least the time of completion of filling and the time of completion of $CO_2$ collection if the time of completion of filling and the time of completion of $CO_2$ collection differ and displaying the option of completing both of fueling and collection of $CO_2$ or seeking confirmation of ending the fueling and collection of $CO_2$ at the point of time when either of these is completed.

When receiving the result of selection, the service station-side control device 220 sends a $CO_2$ collection plan corresponding to the result of selection to the service station-side control device 220. Specifically, when the received result of selection is a result of selection of completing both fueling and collection of $CO_2$ at the point of time when either is completed, the service station-side control device 220 corrects the fueling plan and $CO_2$ collection plan according to the result of selection and sends the corrected $CO_2$ collection plan. On the other hand, when the received result of selection is another result of selection, it sends the prepared $CO_2$ collection plan without correcting the already prepared fueling plan and $CO_2$ collection plan (at S34, Yes, S35).

Further, the vehicle-side control device 120 and service station-side control device 220 perform filling of the fuel tank 2 and collection of $CO_2$ from the $CO_2$ recovery device 4 in accordance with the fueling plan and $CO_2$ collection plan corresponding to the result of selection (S11, S36).

According to the present embodiment explained above, the vehicle-side control device 120 is configured so that when the time of completion of filling of the fuel tank 2 and the time of completion of collection of $CO_2$ from the $CO_2$ recovery device 4 differ, it makes the display part 130 display in a selectable format the options of completing both filling of the fuel tank 2 and collection of $CO_2$ from the $CO_2$ recovery device 4 or ending filling and collection of $CO_2$ at the point of time when either among them is completed.

Due to this, it becomes possible to perform fueling and collection of $CO_2$ according to the intent of the worker performing the fueling work and $CO_2$ collection work, so the worker friendliness when performing the fueling work and $CO_2$ collection work can be further improved.

Note that in the present embodiment as well, when the time of completion of filling and the time of completion of $CO_2$ collection differ, the mobile terminal of an occupant of the vehicle 100 or other worker can be made to display the option of completing both the fueling of the fuel tank and collection of $CO_2$ or ending the charging and collection of $CO_2$ at the point of time of completing either among these in a selectable format.

Sixth Embodiment

Next, a sixth embodiment of the present disclosure will be explained. The present embodiment differs from the fourth embodiment on the point of making the display part 130 display information to the effect that some sort of abnormality has occurred and filling of the fuel tank 2 or collection of $CO_2$ from the $CO_2$ recovery device 4 can no longer be continued when that occurs. Below, the point of difference will be focused on in the explanation.

Figure 15:
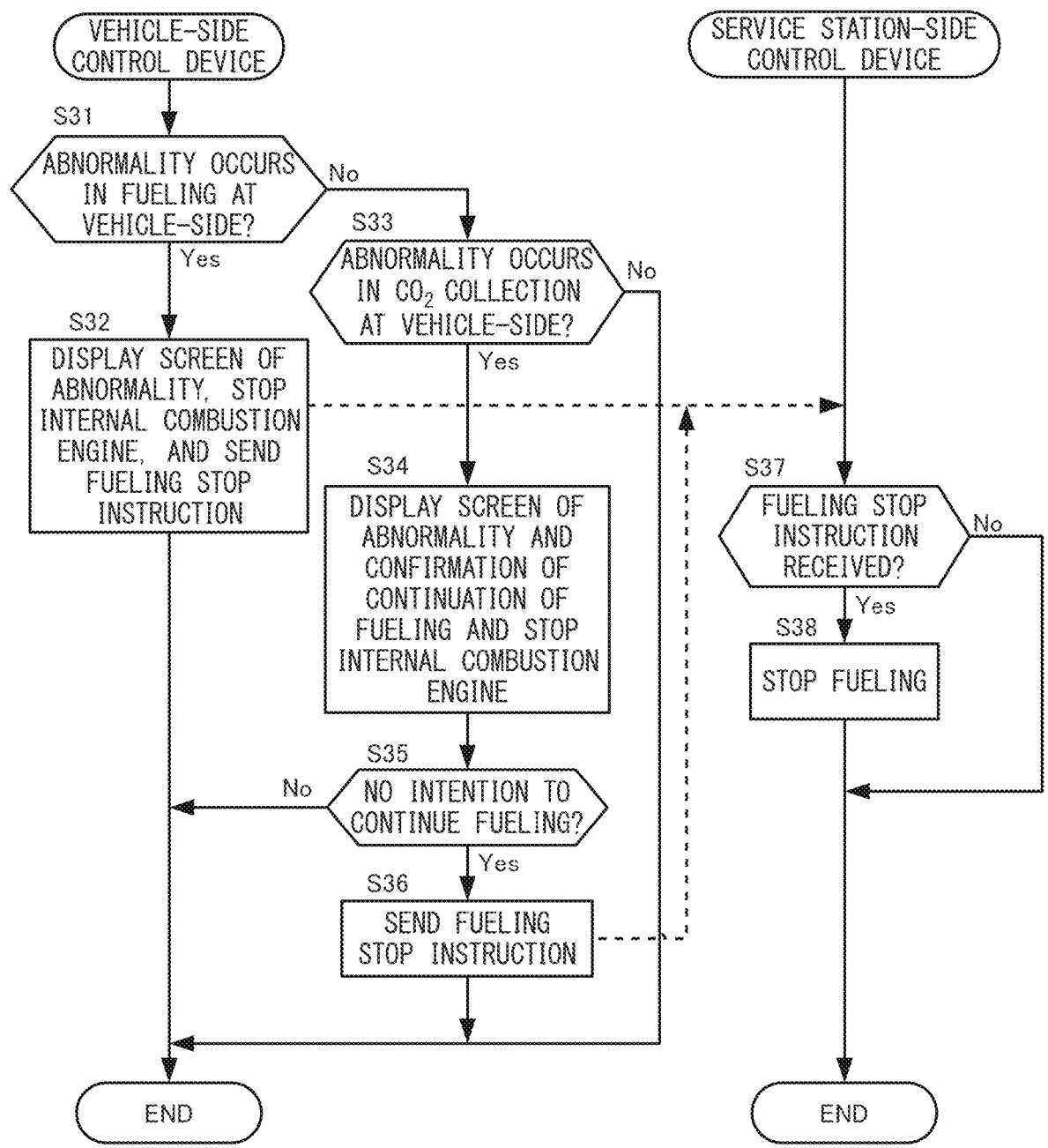
FIG. 15 is a flow chart explaining the content of processing according to a sixth embodiment of the present disclosure performed by the vehicle-side control device and service station-side control device when some sort of abnormality occurs at the vehicle side and the fueling work or $CO_2$ collection work can no longer be continued.

FIG. 15 is a flow chart explaining the content of processing according to the present embodiment performed by the vehicle-side control device 120 and service station-side control device 220 when some sort of abnormality occurs at the vehicle-side and filling of the fuel tank 2 or collection of $CO_2$ from the $CO_2$ recovery device 4 can no longer be continued.

Figure 16:
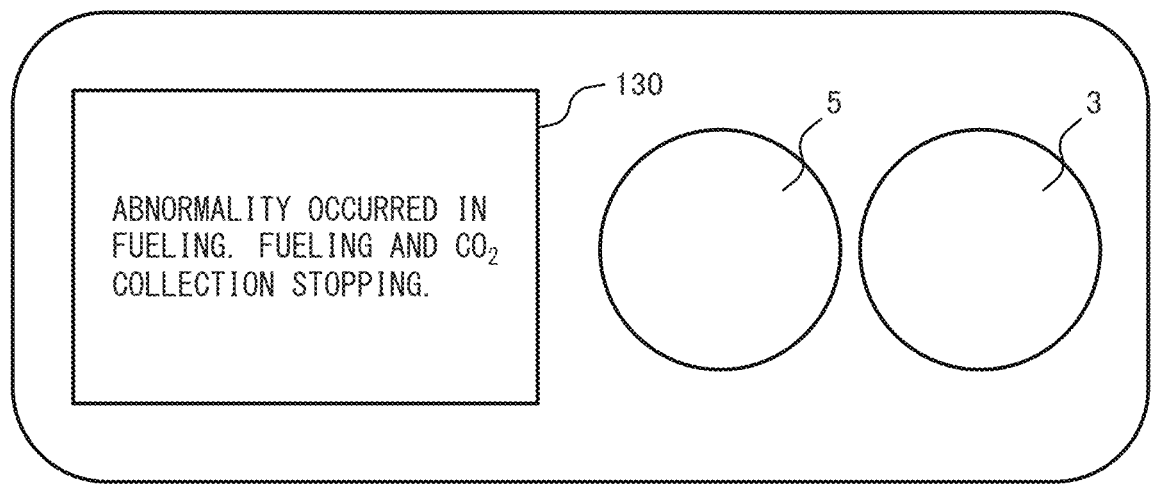
FIG. 16 is a view showing one example of a screen informing the occurrence of an abnormality in fueling.

As shown in the flow chart of FIG. 15, when some sort of abnormality occurs at the vehicle-side and filling of the fuel tank 2 can no longer be continued (at S31, Yes), it is not desirable to operate the internal combustion engine 1 and consume fuel inside the fuel tank 2, so the vehicle-side control device 120 stops the operation of the internal combustion engine 1 and sends the service station-side control device 220 a fueling stop instruction (S32). Further, the vehicle-side control device 120, for example, as shown in FIG. 16, makes the display part 130 display that n abnormality occurred in the fueling and to stop the fueling and $CO_2$ collection (S32).

Figure 17:
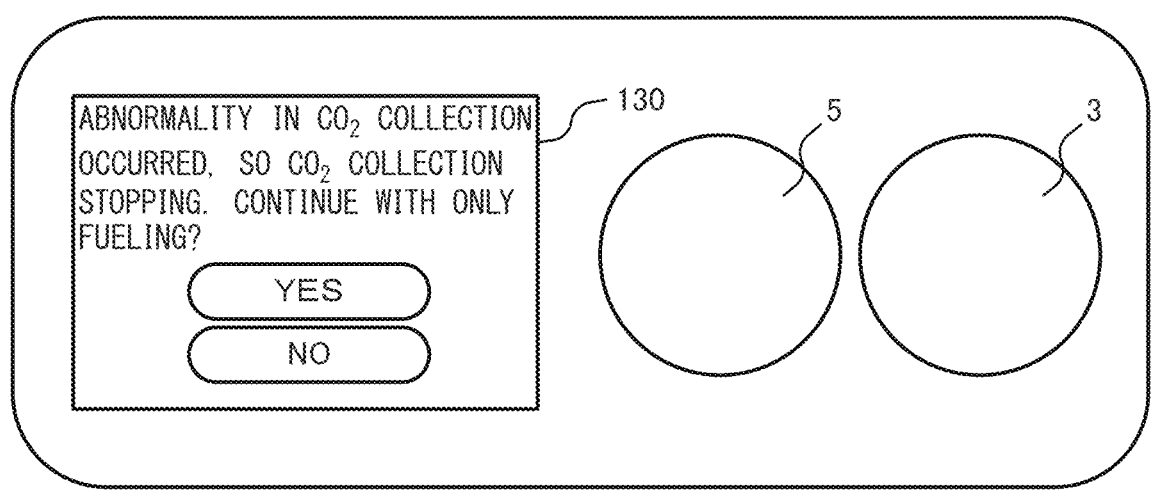
FIG. 17 is a view showing one example of a screen informing the occurrence of an abnormality in collection of $CO_2$.

Further, when some sort of abnormality occurs at the vehicle-side and collection of $CO_2$ can no longer be continued (at S31, No, at S33, Yes), the vehicle-side control device 120 stops the operation of the internal combustion engine 1 and, for example, as shown in FIG. 17, makes the display part 130 display to stop collection of $CO_2$ due to the occurrence of an abnormality of collection of $CO_2$ and the option of seeking confirmation of whether to continue filling of the fuel tank 2 (S34). Further, when the worker selects not to continue filling of the fuel tank 2 (at S35, Yes), the vehicle-side control device 120 sends the service station-side control device 220 a fueling stop instruction (S36).

The service station-side control device 220 stops the filling of the fuel tank 2 when receive the fueling stop instruction (at S37, Yes, S38).

Figure 18:
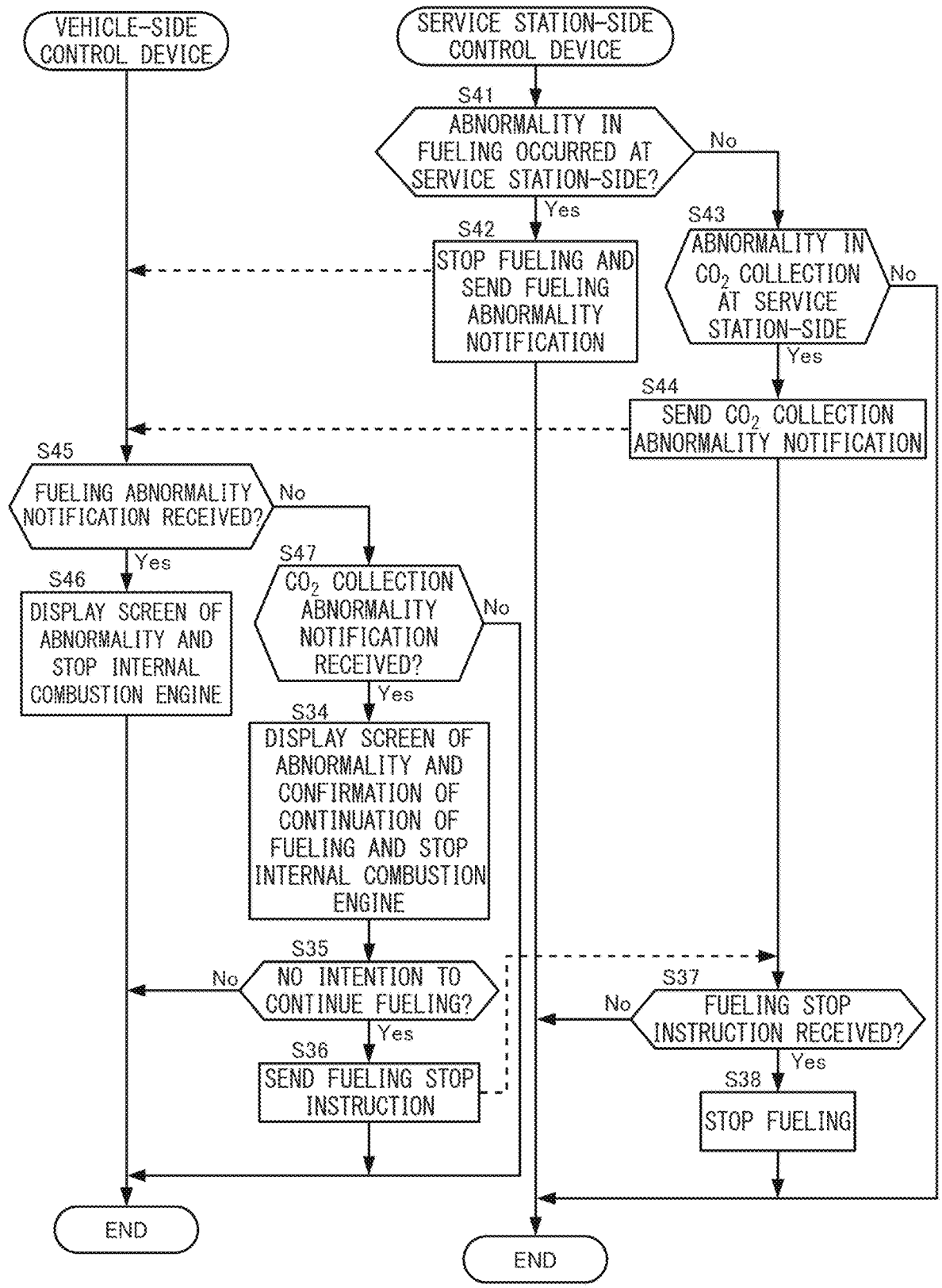
FIG. 18 is a flow chart explaining the content of processing according to a sixth embodiment of the present disclosure performed by the vehicle-side control device and service station-side control device when some sort of abnormality occurs at the service station side and the fueling work or $CO_2$ collection work can no longer be continued.

FIG. 18 is a flow chart explaining the content of processing according to the present embodiment performed by the vehicle-side control device 120 and service station-side control device 220 when some sort of abnormality occurs at the service station 200 side and filling of the fuel tank 2 or collection of $CO_2$ from the $CO_2$ recovery device 4 can no longer be continued.

As shown in the flow chart of FIG. 18, when some sort of abnormality occurs at the service station 200 side and filling of the fuel tank 2 can no longer be continued (at S41, Yes), the service station-side control device 220 stops the filling of the fuel tank 2 and sends a fueling abnormality notification to the vehicle-side control device 120 (S42). Further, when some sort of abnormality occurs at the service station 200 side and collection of $CO_2$ can no longer be continued (at S41, No, at S43, Yes), the service station-side control device 220 sends a $CO_2$ collection abnormality notification to the vehicle-side control device 120 (S44).

When receiving the fueling abnormality notification, the vehicle-side control device 120 stops the operation of the internal combustion engine 1. Further, as shown in the above-mentioned FIG. 16, it makes the display part 130 display that an abnormality has occurred in the fueling and to stop the fueling and collection of $CO_2$ (S42). Further, when notifying the occurrence of an abnormality in $CO_2$ collection, the vehicle-side control device 120, as shown in the above-mentioned FIG. 17, makes the display part 130 display at least to stop collection of $CO_2$ due to the occurrence of an abnormality in collection of $CO_2$ and the option of seeking confirmation of whether to continue filling of the fuel tank 2 (S34).

According to the present embodiment explained above, the vehicle-side control device 120 is configured to make the display part 130 display information of the fact of occurrence of an abnormality when filling of the fuel tank 2 or collection of $CO_2$ from the $CO_2$ recovery device 4 can no longer be continued at the vehicle 100 side or service station 200 side and further to make the display part 130 display, in a selectable format, whether to continue with only filling of the fuel tank 2 when collection of $CO_2$ from the $CO_2$ recovery device 4 can no longer be continued.

Due to this, when an abnormality occurs, it becomes possible to perform fueling and collection of $CO_2$ according to the intent of the worker performing the fueling work and $CO_2$ collection work, so the worker friendliness when performing the fueling work and $CO_2$ collection work can be further improved.

Note that in the present embodiment as well, a mobile terminal held by an occupant of the vehicle 100 or a worker can be made to display information to the effect of occurrence of abnormality when filling of the fuel tank 2 or collection of $CO_2$ from the $CO_2$ recovery device 4 can no longer be continued at the vehicle 100 side or service station 200 side and further can be made to display whether to continue only fueling of the fuel tank 2 if collection of $CO_2$ from the $CO_2$ recovery device 4 can no longer be continued.

Seventh Embodiment

Next, a seventh embodiment of the present disclosure will be explained. The present embodiment differs from the fourth embodiment on the point of decreasing the charge for the fuel filled in the fuel tank 2 (below, referred to as the "fueling charge") in accordance with the amount of $CO_2$ collection taken out from the $CO_2$ recovery device 4 in the service station 200 and making the display part 130 display information on the fact of the decrease. Below, this point of difference will be focused on in the explanation.

Figure 19:
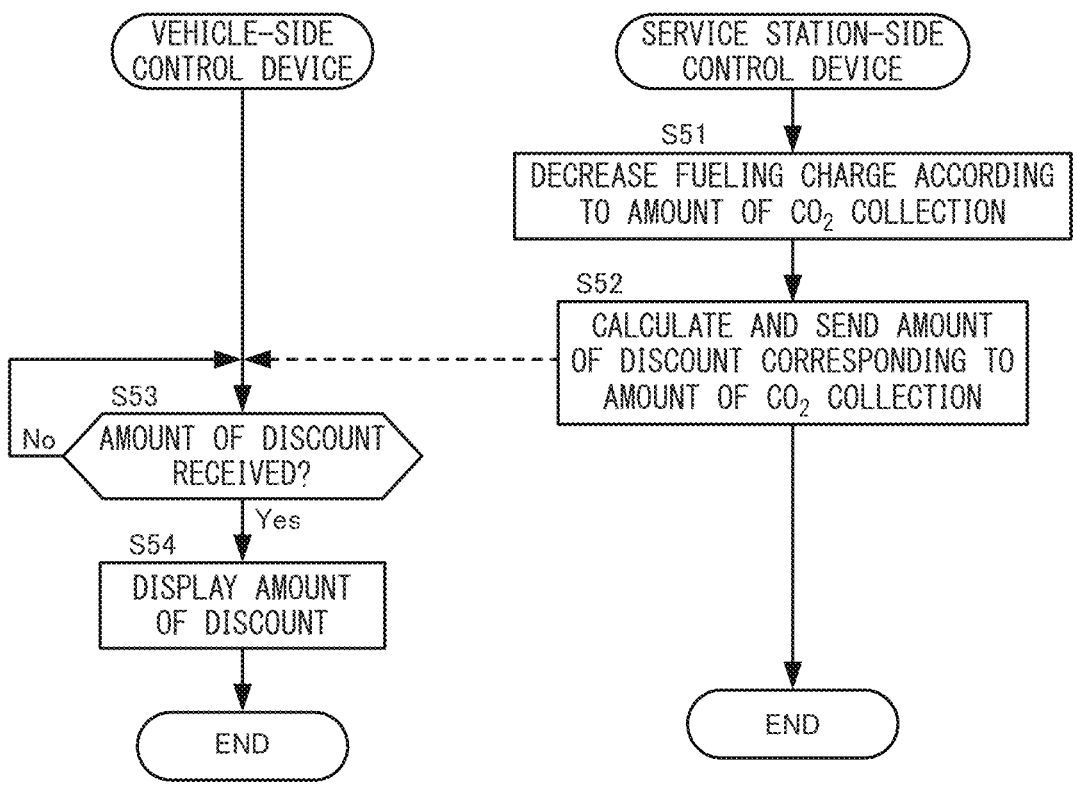
FIG. 19 is a flow chart explaining the content of processing according to the seventh embodiment of the present disclosure performed by the vehicle-side control device and service station-side control device when fueling work and $CO_2$ collection work are completed.

FIG. 19 is a flow chart explaining the content of processing by the present embodiment performed by the vehicle-side control device 120 and service station-side control device 220 when filling of the fuel tank 2 and collection of $CO_2$ from the $CO_2$ recovery device 4 are completed.

Figure 20:
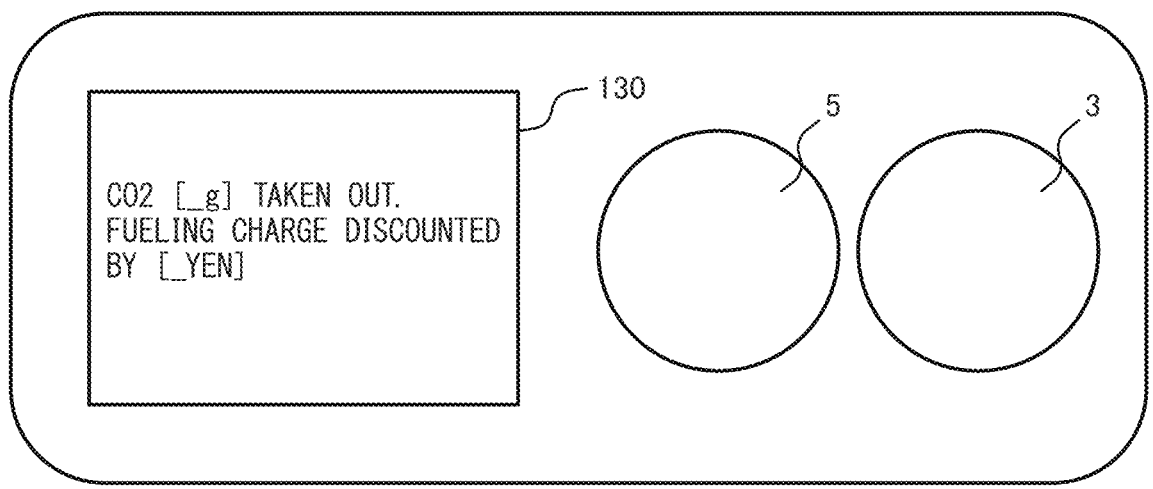
FIG. 20 is a view showing one example of a screen displaying an amount of discount in accordance with an amount of $CO_2$ collection.

As shown in the flow chart of FIG. 19, if filling of the fuel tank 2 and collection of $CO_2$ from the $CO_2$ recovery device 4 are completed, the service station-side control device 220 decreases the fueling charge at the service station 200 in accordance with the amount of $CO_2$ collection taken out from the $CO_2$ recovery device 4 (S51). Further, the service station-side control device 220 sends an amount of discount of the fueling charge corresponding to the amount of $CO_2$ collection together with the amount of $CO_2$ collection to the vehicle-side control device 120 (S52). Further, if receiving the amount of discount of the fueling charge, the vehicle-side control device 120, for example, as shown in FIG. 20, makes the display part 130 display the amount of $CO_2$ collection and the amount of discount (at S53, Yes, S54).

The service station-side control device 220 of the service station 200 according to the present embodiment explained above is configured to decrease the fueling charge in accordance with the amount of $CO_2$ collection taken out from the $CO_2$ recovery device 4.

Due to this, the merits of owning a vehicle 100 mounting the $CO_2$ recovery device 4 can be seen, so it is possible to promote the spread of vehicles 100 mounting $CO_2$ recovery devices 4 and promote the recovery of $CO_2$ from the atmosphere.

Eighth Embodiment

Next, an eighth embodiment of the present disclosure will be explained.

Figure 21:
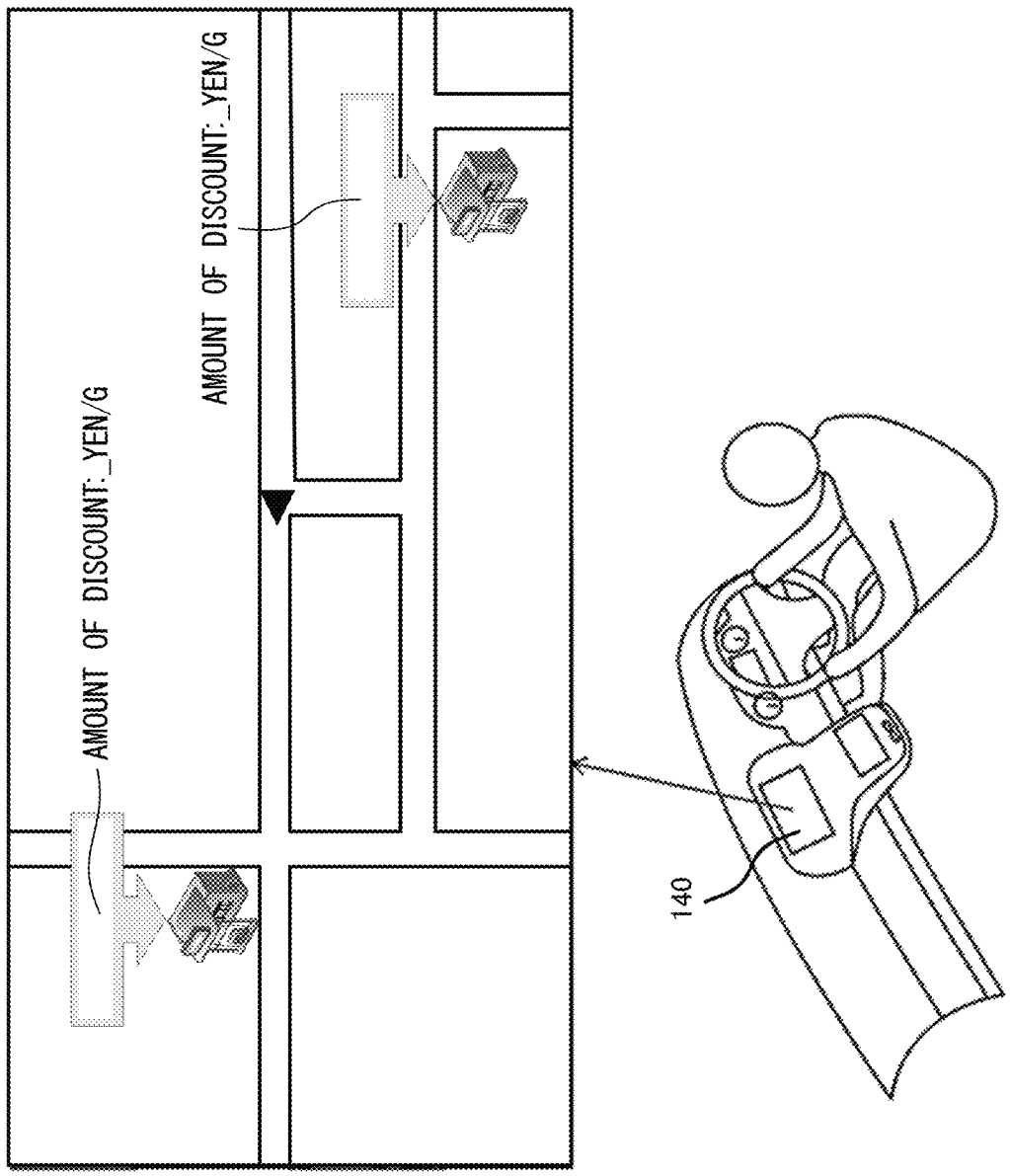
FIG. 21 is a view showing one example of a screen displayed on an onboard display part.

As shown in FIG. 21, the vehicle 100 according to the present embodiment is provided with an onboard display part 140 providing the vehicle occupant with various types of information at a position which a vehicle occupant inside the vehicle can see. The vehicle-side control device 120 is configured to display discount information of fueling charges corresponding to the amount of $CO_2$ collection when collecting $CO_2$ from the $CO_2$ recovery device 4 at the service station 200 at a position of the service station 200 on the map displayed at the onboard display part 140 (for example, discount amount per unit amount of collection).

Due to this, the vehicle occupant can obtain a grasp of service stations 200 offering large discounts, so the vehicle occupant can be made to feel more the merits of the vehicle 100 mounting the $CO_2$ recovery device 4.

Above, embodiments of the present disclosure were explained, but the above embodiments only show some of the examples of application of the present disclosure and are not meant to limit the technical scope of the present disclosure to the specific configurations of the above embodiments.

For example, in the above third embodiment, when the exhaust pipe 11 is provided with a PM trapping device trapping particulate matter (PM) in the exhaust, before collecting $CO_2$ from the $CO_2$ recovery device 4, first the internal combustion engine 1 may be operated using fuel supplied from the service station 200 to the fuel tank 2 in the state closing the shutoff valve provided at the connecting pipe 12 to introduce high temperature exhaust to the PM trapping device to burn off the particulate matter trapped at the PM trapping device. Further, after the PM trapping device finishes being regenerated, the internal combustion engine 1 may be operated using the fuel supplied from the service station 200 to the fuel tank 2 in the state opening the shutoff valve provided at the connecting pipe 12 so as introduce high temperature exhaust to the adsorption part 45 to heat the adsorption part 45.

Further, in the above third embodiment, when collecting $CO_2$ from the $CO_2$ recovery device 4, the exhaust discharged from the internal combustion engine 1 is introduced to the adsorption part 45 to heat the adsorption part 45 to make $CO_2$ desorb from the solid adsorbent of the adsorption part 45.

Figure 22:
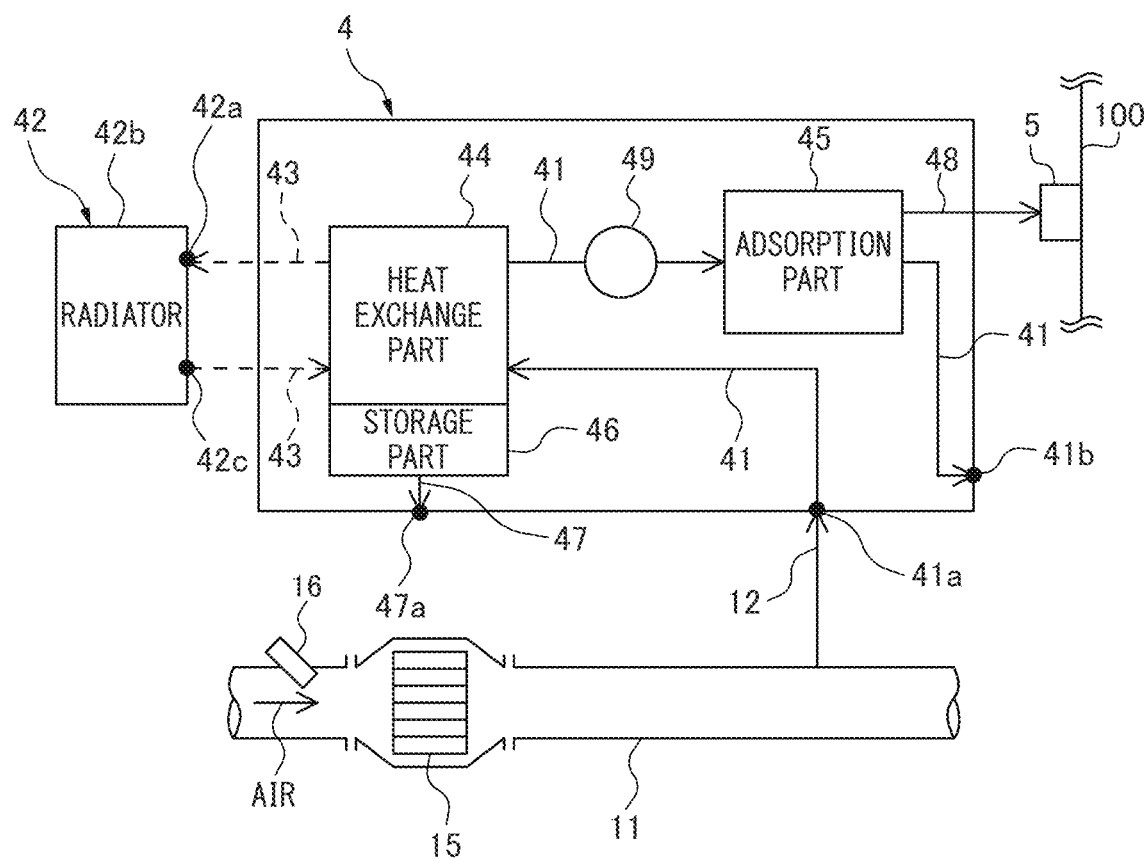
FIG. 22 is a schematic view of the configuration of a $CO_2$ recovery device according to another embodiment of the present disclosure.

However, the disclosure is not limited to this. For example, as shown in FIG. 22, the exhaust pipe 11 may be provided with an oxidation catalyst 15 and, further, a fuel addition device 16 able to supply fuel at the inside of the fuel tank 2 to the oxidation catalyst 15 may be provided at the exhaust pipe 11 at the upstream side from the oxidation catalyst 15. When collecting $CO_2$ from the $CO_2$ recovery device 4, the vehicle-side control device 120 may be used to heat the $CO_2$ recovery device 4 in the following way.

That is, when collecting $CO_2$ from the $CO_2$ recovery device 4, the internal combustion engine 1 may, for example, be turned over by a starter motor or other electric motor to supply air to the exhaust pipe 11 (exhaust passage) and fuel may be injected from the fuel addition device 16 to supply fuel to the oxidation catalyst 15 to heat the air by the heat of oxidation when oxidizing the fuel on the oxidation catalyst 15 and the air introduced to the $CO_2$ recovery device 4 to thereby heat the $CO_2$ recovery device 4.

The invention claimed is:

1. A vehicle comprising:
    a fuel tank for storing fuel;
    a fueling port for supplying the fuel tank with fuel;
    a $CO_2$ recovery device configured to recover $CO_2$;
    a $CO_2$ collection port for collecting $CO_2$ from the $CO_2$ recovery device; and
    a single openable lid configured to cover both the fueling port and the $CO_2$ collection port;
    an internal combustion engine; and
    a control device, wherein
    the $CO_2$ recovery device is configured to be able to recover $CO_2$ in exhaust discharged from the internal combustion engine, and
    the control device is configured to control the internal combustion engine so that high temperature exhaust is discharged from the internal combustion engine when collecting $CO_2$ from the $CO_2$ recovery device and to heat the $CO_2$ recovery device by introducing high temperature exhaust to the $CO_2$ recovery device.

2. A vehicle comprising:
    a fuel tank for storing fuel;
    a fueling port for supplying the fuel tank with fuel;
    a $CO_2$ recovery device configured to recover $CO_2$;

a CO₂ collection port for collecting $CO_2$ from the $CO_2$ recovery device; and
a single openable lid configured to cover both the fueling port and the $CO_2$ collection port;
an internal combustion engine;
an oxidation catalyst provided in an exhaust passage of the internal combustion engine;
a fuel addition device provided in the exhaust passage at an upstream side from the oxidation catalyst in the direction of flow of exhaust and supplying fuel to the oxidation catalyst; and
a control device, wherein
the $CO_2$ recovery device is configured to be able to recover $CO_2$ in exhaust discharged from the internal combustion engine, and
the control device is configured to turn over the internal combustion engine by a motor to supply air to the exhaust passage when collecting $CO_2$ from the $CO_2$ recovery device and to inject fuel from the fuel addition device to supply fuel to the oxidation catalyst, use the heat of oxidation when making the fuel oxidize on the oxidation catalyst to heat air, and introduce that air to the $CO_2$ recovery device to thereby heat the $CO_2$ recovery device.

3. A vehicle comprising:
a fuel tank for storing fuel;
a fueling port for supplying the fuel tank with fuel;
a $CO_2$ recovery device configured to recover $CO_2$;
a $CO_2$ collection port for collecting $CO_2$ from the $CO_2$ recovery device; and
a single openable lid configured to cover both the fueling port and the $CO_2$ collection port, wherein
the fueling port and the $CO_2$ collection port are made an integral connection port comprised of the fueling port and the $CO_2$ collection port which are integrally joined, and
the integral connection port is configured to enable connection of an integral hose comprised of a filling hose connected to the fueling port and a collection hose connected to the $CO_2$ collection port which are integrally joined;
a display part configured to provide information to a worker performing work of filling the fuel tank and work of collecting $CO_2$ from the $CO_2$ recovery device;
a communication device configured to communicate with a service station for providing the fuel to be filled to the fuel tank and collecting $CO_2$ from the $CO_2$ recovery device; and
a control device, wherein
the control device is configured to make the display part display information on a time of completion of filling the fuel tank and a time of completion of collection of $CO_2$ from the $CO_2$ recovery device received from the service station through the communication device, wherein
the control device is further configured to make the display part display in a selectable format whether to complete both filling the fuel tank and collecting $CO_2$ from the $CO_2$ recovery device or whether to end the fueling and the $CO_2$ collection at the time when one among these has been completed when the time of completion of filling the fuel tank and the time of completion of collection of $CO_2$ from the $CO_2$ recovery device differ.

4. The vehicle according to claim 3, wherein the control device is further configured to display discount information of a fueling charge according to the amount of collection of $CO_2$ taken out when collecting $CO_2$ from the $CO_2$ recovery device at the service station for providing the fuel to be filled to the fuel tank of the vehicle and for collecting $CO_2$ from the $CO_2$ recovery device on a map displayed at an onboard display part configured to provide information to an occupant of the vehicle.

5. A system comprising:
the vehicle according to claim 3,
a terminal associated with an occupant of the vehicle, the terminal comprising:
a terminal display part for displaying information;
a terminal communication device configured to be able to communicate with the service station for supplying the fuel tank with fuel and for collecting $CO_2$ from the $CO_2$ recovery device; and
a terminal processing device configured to make the terminal display part display information relating to the time of completion of filling the fuel tank and the time of completion of collection of CO2 from the CO2 recovery device received from the service station-side through the terminal communication device.

6. The system according to claim 5, wherein the terminal processing device is configured to make the terminal display part display in a selectable format whether to complete both filling the fuel tank and collecting $CO_2$ from the $CO_2$ recovery device or whether to end the fueling and the $CO_2$ collection at the time when one among these has been completed when the time of completion of filling the fuel tank the time of completion of collection of $CO_2$ from the $CO_2$ recovery device differ.

7. A system comprising:
the vehicle according to claim 3; and
the service station for providing the fuel to be filled to the fuel tank of the vehicle and collecting $CO_2$ from the $CO_2$ recovery device of the vehicle,
the service station comprising:
a service station-side communication device configured to receive vehicle-side information including an empty volume of the fuel tank sent from the communication device of the vehicle and an amount of $CO_2$ recovery of the $CO_2$ recovery device; and
a service station-side control device configured to control the amount of fuel supplied to the fuel tank and the amount of $CO_2$ collected from the $CO_2$ recovery device based on the vehicle-side information so that the time of completion of filling the fuel tank and the time of completion of collection of $CO_2$ from the $CO_2$ recovery device become the same times.

8. A system comprising:
the vehicle of claim 3; and
the service station for providing the fuel to be filled to the fuel tank of the vehicle and collecting $CO_2$ from the $CO_2$ recovery device of the vehicle, the service station is configured to discount a fueling charge in accordance with the amount of $CO_2$ collected from the $CO_2$ recovery device.

9. A vehicle comprising:
a fuel tank for storing fuel;
a fueling port for supplying the fuel tank with fuel;
a $CO_2$ recovery device configured to recover $CO_2$;
a $CO_2$ collection port for collecting $CO_2$ from the $CO_2$ recovery device; and
a single openable lid configured to cover both the fueling port and the $CO_2$ collection port, wherein the fueling port and the $CO_2$ collection port are made an integral connection port comprised of the fueling port and the $CO_2$ collection port which are integrally joined, and the integral connection port is configured to enable connection of an integral hose comprised of a filling hose connected to the fueling port and a collection hose connected to the $CO_2$ collection port which are integrally joined;

a display part configured to provide information to a worker performing work of filling the fuel tank and work of collecting $CO_2$ from the $CO_2$ recovery device;

a communication device configured to communicate with a service station for providing the fuel to be filled to the fuel tank and collecting $CO_2$ from the $CO_2$ recovery device; and a control device, wherein the control device is configured to make the display part display information on a time of completion of filling the fuel tank and a time of completion of collection of $CO_2$ from the $CO_2$ recovery device received from the service station through the communication device, wherein the control device is further configured to make the display part display information on when filling of the fuel tank or collection of $CO_2$ from the $CO_2$ recovery device can no longer be continued when that is so and to display in a selectable format whether to continue only filling the fuel tank if collection of $CO_2$ from the $CO_2$ recovery device can no longer be continued.

* * * * *